US008243994B2

(12) United States Patent
Suzuki et al.

(10) Patent No.: US 8,243,994 B2
(45) Date of Patent: Aug. 14, 2012

(54) VEHICLE CIRCUMFERENTIAL IMAGE PROVIDING DEVICE AND VEHICLE CIRCUMFERENTIAL IMAGE PROVIDING METHOD

(75) Inventors: Masayasu Suzuki, Kawasaki (JP); Takeshi Akatsuka, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 960 days.

(21) Appl. No.: 12/298,837

(22) PCT Filed: Apr. 25, 2007

(86) PCT No.: PCT/JP2007/058961

§ 371 (c)(1), (2), (4) Date: Oct. 28, 2008

(87) PCT Pub. No.: WO2007/129582

PCT Pub. Date: Nov. 15, 2007

(65) Prior Publication Data

US 2009/0257659 A1 Oct. 15, 2009

(30) Foreign Application Priority Data

May 9, 2006 (JP) ................................ 2006-130269

(51) Int. Cl.

*G06K 9/36* (2006.01)
*G06T 3/00* (2006.01)

(52) U.S. Cl. ......................... 382/104; 382/284; 382/294

(58) Field of Classification Search .................. 382/104, 382/199, 284, 293, 294, 295; 348/148; 340/937, 340/435, 436, 437

See application file for complete search history.

(56) References Cited

U.S. PATENT DOCUMENTS

| | | | | |
|---|---|---|---|---|
| 2006/0029255 | A1* | 2/2006 | Ozaki | 382/104 |
| 2007/0085901 | A1* | 4/2007 | Yang et al. | 348/47 |
| 2008/0181591 | A1* | 7/2008 | Hongo | 396/50 |

FOREIGN PATENT DOCUMENTS

| | | | |
|---|---|---|---|
| JP | 7-236113 | A | 9/1995 |
| JP | 9-73545 | A | 3/1997 |
| JP | 2001-186512 | A | 7/2001 |
| JP | 2001-236506 | A | 8/2001 |
| JP | 2003-169323 | A | 6/2003 |

* cited by examiner

*Primary Examiner* — Andrew W Johns

(74) *Attorney, Agent, or Firm* — Foley & Lardner LLP

(57) ABSTRACT

In a vehicle circumferential image providing device 1, an image converting unit 53 generates an overhead image 205 from images picked up with plural camera modules 10. An image detecting unit 54 performs edge detection in an overhead image 205. Further, the image detecting unit 54 determines continuity of edge lines connecting between connected parts in the overhead image 205, among the detected edge lines. When the edge lines striding over the connected parts in the overhead image 205 are discontinuous, the image detecting unit 54 sets edge lines at the far side of the own vehicle to match edge lines at the near side of the own vehicle, thereby setting the edge lines continuous at the connected parts.

10 Claims, 18 Drawing Sheets

VEHICLE CIRCUMFERENTIAL IMAGE PROVIDING DEVICE AND VEHICLE CIRCUMFERENTIAL IMAGE PROVIDING METHOD

TECHNICAL FIELD

The present invention relates to a vehicle circumferential image providing device and a vehicle circumferential image providing method.

BACKGROUND ART

There has been conventionally known a vehicle circumferential image providing device that images a circumference of a vehicle with plural cameras, converts an obtained image into coordinates to generate an image of the vehicle from a virtual viewpoint, and presents this image to a driver. There are many vehicle circumferential image providing devices that generate overhead images using a ground surface as a reference surface of the coordinate conversion. By presenting an overhead image to the driver, each device enables the driver to objectively recognize a positional relationship between white lines on the ground surface and the own vehicle, thereby supporting a parking and a pulling over to a curb (for example, see Patent Document 1).

In general, when an object of which edge position is with a distance from the ground surface is picked up from obliquely above, and when the picked-up image is coordinate-converted, the edge position is presented in deviation at a position different from the actual position. The amount of this deviation is different depending on an imaging position of the object. Therefore, when a vehicle circumferential image providing device images an object with plural cameras, and combines plural coordinate-converted images, such as the conventional vehicle circumferential image providing device, edge lines become discontinuous at connected parts of the images. As a result, the driver finds it difficult to watch the combined images.

The present invention has been achieved to solve the above conventional problems. An object of the present invention is to provide a vehicle circumferential image providing device and a vehicle circumferential image providing method capable of solving the problem of inconvenience of watching connected parts of plural images while maintaining safety of a driver.

Patent Document 1: Japanese Patent Application Laid-open No. 2003-169323

DISCLOSURE OF THE INVENTION

A vehicle circumferential image providing device according to the present invention provides a driver of a vehicle with images of the circumference of the vehicle. This vehicle circumferential image providing device includes plural imaging units, an image processing unit, an edge detecting unit, a determining unit, and an image processing unit. The plural imaging units image the circumference of the own vehicle, and each imaging unit images a different direction. The image processing unit coordinate-converts images of the circumference of the vehicle imaged by the plural imaging units, using a ground surface as a reference surface, and generates coordinate-converted images. The image processing unit combines the generated coordinate-converted images, and generates an overhead image. The edge detecting unit detects an edge of the overhead image generated by the image processing unit. The determining unit determines continuity of edge lines striding over connected parts of the coordinate-converted images among the edge lines detected by the edge detecting unit. When the edge lines striding over the connected parts of the coordinate-converted images are discontinuous, the image processing unit matches an edge line at the far side of the own vehicle with an edge line at the near side of the own vehicle, thereby expressing the edge lines continuous at the connected parts.

In the present invention, when the edge lines striding over the connected parts of the coordinate-converted images are discontinuous, an edge line at the far side of the own vehicle is matched with an edge line at the near side of the own vehicle, thereby correcting the edge lines to become continuous at the connected parts of the coordinate-converted images. That is, in the present invention, the correction of edge lines to become continuous at the connected parts of the images is performed using image processing. At the same time, other edge line is matched with the edge line at the near side of the own vehicle where the amount of deviation between the actual position and a position on the image is relatively small as viewed from the own vehicle. Therefore, according to the present invention, inconvenience of watching the connected parts of plural images can be avoided while maintaining the safety of the driver.

BEST MODE FOR CARRYING OUT THE INVENTION

Preferred embodiments of the present invention are explained below based on the drawings.

Figure 1:
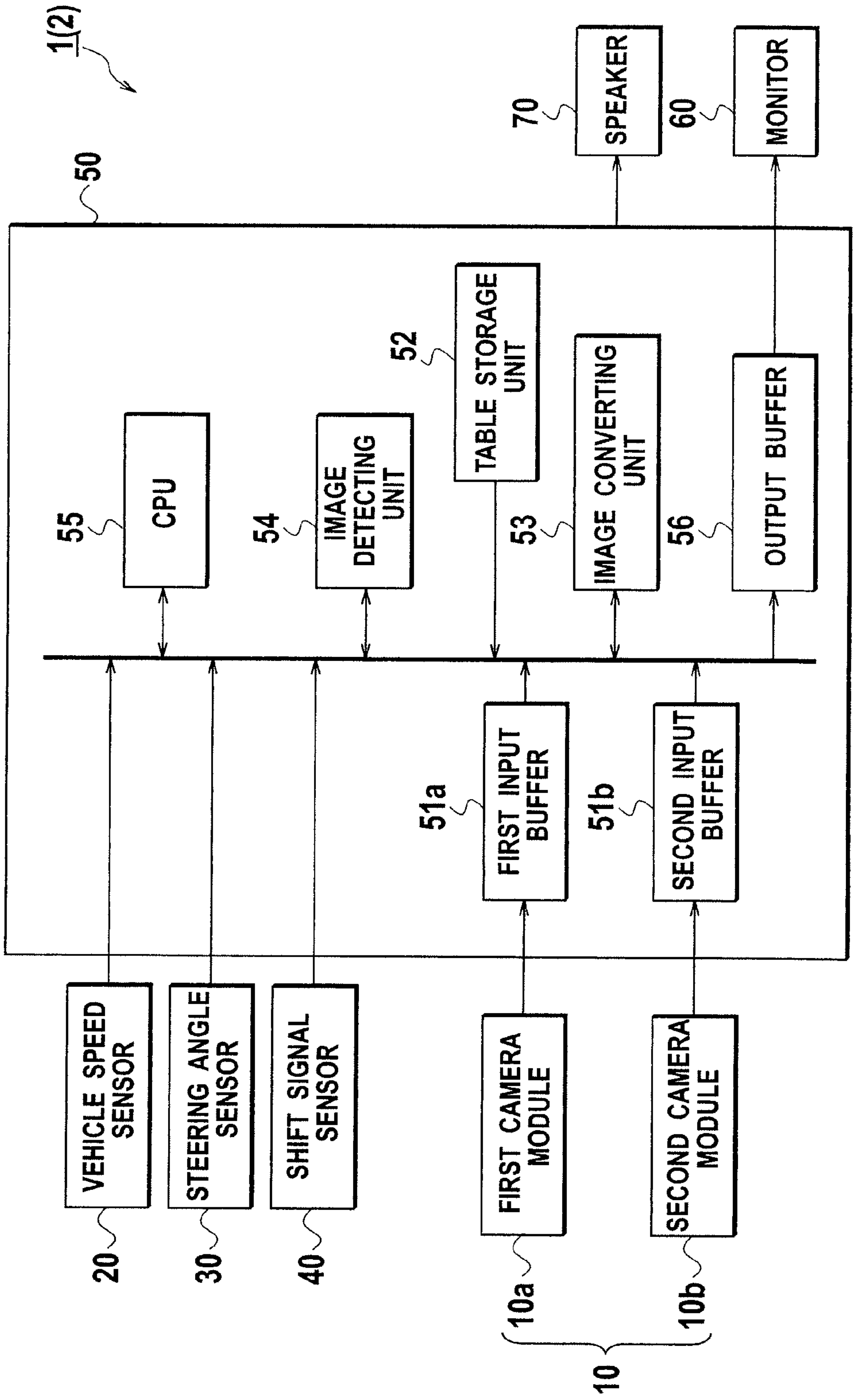
FIG. 1 is a configuration diagram of a vehicle circumferential image providing device according to a first embodiment of the present invention.

FIG. 1 is a configuration diagram of a vehicle circumferential image providing device according to a first embodiment of the present invention. As shown in FIG. 1, a vehicle circumferential image providing device 1 according to the present embodiment provides a driver of a vehicle with images of the circumference of the vehicle. The vehicle circumferential image providing device includes plural camera modules 10, a vehicle speed sensor 20, a steering angle sensor 30, a shift signal sensor 40, an image processing device 50, a monitor 60, and a speaker 70.

The plural camera modules 10 image the circumference of the own vehicle. A CCD camera and a CMOS camera, for example, are used for these camera modules 10. As shown in FIG. 1, the camera modules 10 include two camera modules of a first camera module 10*a*, and a second camera module 10*b*. Each camera module images a different direction to obtain image data, and transmits the obtained image data to the image processing device 50. The number of the camera modules 10 is not limited to two. At least two camera modules are sufficient, and three or more camera modules can be also provided.

The vehicle speed sensor 20 detects a vehicle speed of the own vehicle. The steering angle sensor 30 detects a steering angle of the own vehicle. The shift signal sensor 40 detects a shift position (a gear position) of the own vehicle. These sensors 20, 30, and 40 output their detection results to the image processing device 50.

The image processing device 50 processes the images of the circumference of the vehicle picked up with the camera modules 10. The image processing device 50 includes a first input buffer 51*a*, a second input buffer 51*b*, a table storage unit 52, an image converting unit 53, an image detecting unit 54, a CPU 55, and an output buffer 56.

The first input buffer 51*a* inputs image data from the first camera module 10*a*, and stores this image data. The second input buffer 51*b* also inputs image data from the second camera module 10*b*, and stores this image data, such as the first input buffer 51*a*.

The table storage unit 52 stores an address conversion table for coordinate-converting the images of the circumference of the vehicle picked up with the camera modules 10, using a ground surface as a reference surface. The image converting unit 53 generates coordinate-converted images by coordinate-converting the images of the circumference of the vehicle picked up with the plural camera modules 10, using the address conversion table stored in the table storage unit 52. The image converting unit 53 also generates an overhead image as an image of the own vehicle looked at from the sky, by combining the generated coordinate-converted images.

Figure 2:
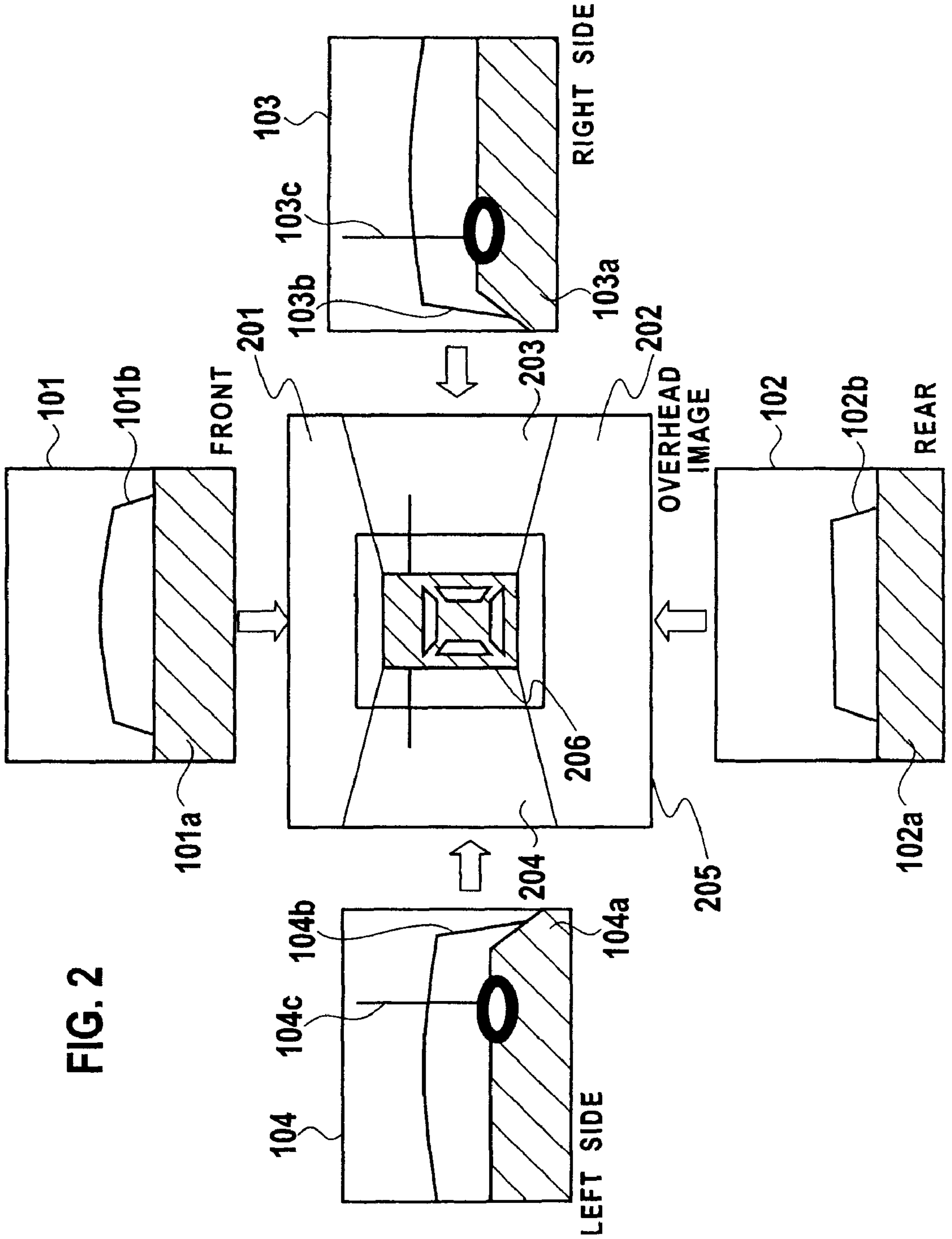
FIG. 2 shows one example of an overhead image obtained by performing a coordinate conversion by an image converting unit shown in FIG. 1.

Generation of an overhead image is explained in further detail. FIG. 2 shows one example of an overhead image obtained by performing a coordinate conversion by the image converting unit 53 shown in FIG. 1. In the explanation of FIG. 2, it is assumed that one camera module 10 is provided at the front side of the vehicle, at both sides of the vehicle, and at the rear side of the vehicle, respectively so that the total four camera modules 10 can image four directions.

First, when the vehicle is stationary within a parking frame, the camera module 10 at the front side of the vehicle can obtain a front image 101. The front image 101 includes an image of a vehicle body 101*a* of the own vehicle and a parking frame 101*b* at the front side. The camera module 10 at the rear side of the vehicle obtains a rear image 102. The rear image 102 includes an image of a vehicle body 102*a* of the own vehicle and a parking frame 102*b* at the front side.

The camera module 10 at the right side of the vehicle obtains a right-side image 103, and the camera module 10 at the left side of the vehicle obtains a left-side image 104. The right-side image 103 includes a vehicle body 103*a* of the own vehicle and a parking frame 103*b* at the front side, and the left-side image 104 includes a vehicle body 104*a* of the own vehicle and a parking frame 104*b* at the front side.

The image converting unit 53 coordinate-converts the images 101 to 104 based on the address conversion table stored in the table storage unit 52. That is, the image converting unit 53 generates a coordinate-converted image 201 which is an image at the front side of the vehicle looked at from the sky, by coordinate-converting the front image 101. Similarly, the image converting unit 53 generates a coordinate-converted image 202 which is an image at the rear side of the vehicle looked at from the sky, by coordinate-converting the rear image 102. The image converting unit 53 generates a coordinate-converted image 203 which is an image at the right side of the vehicle looked at from the sky, by coordinate-converting the right-side image 103. The image converting unit 53 generates a coordinate-converted image 204 which is an image at the left side of the vehicle looked at from the sky, by coordinate-converting the left-side image 104.

The image converting unit 53 combines the generated coordinate-converted images 201 to 204, and generates an overhead image 205 as an image of the circumference of the own vehicle looked at from the sky. The image converting unit 53 lays out an object 205 of the own vehicle at the center of the overhead image 206.

FIG. 1 is referred again. The image detecting unit 54 includes an edge detecting function and a three-dimensional determining function. The edge detecting function is a function of detecting an overhead image generated by the image converting unit 53. The edge detecting function detects an edge from color information or brightness information of each pixel on the overhead image.

Figure 3:
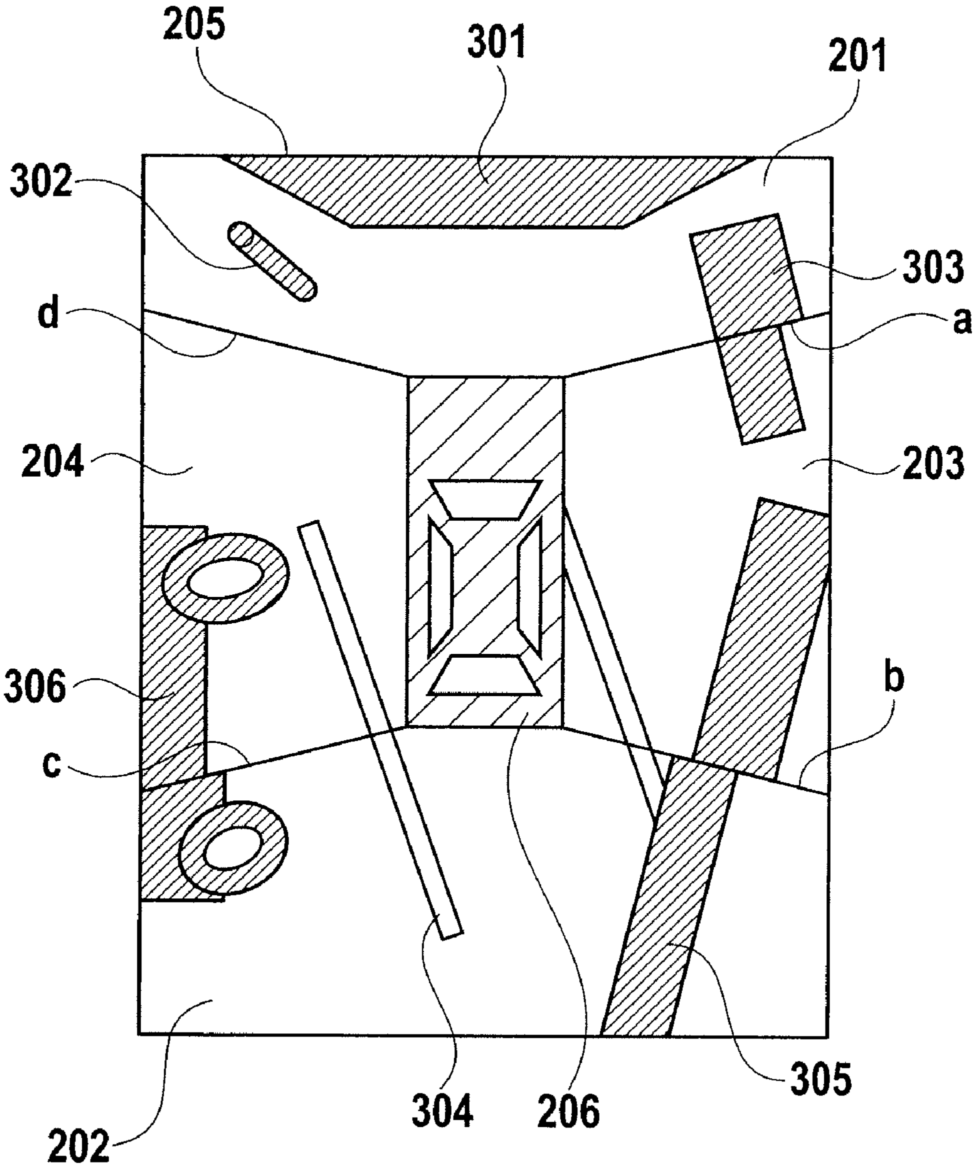
FIG. 3 shows details of an edge detecting function of an image detecting unit shown in FIG. 1, and shows one example of an overhead image.

FIG. 3 shows details of the edge detecting function of the image detecting unit 54 shown in FIG. 1, and shows one example of an overhead image. As shown in FIG. 3, the coordinate-converted image 201 at the front side included in the overhead image 205 includes an image of a wall 301, a pole 302, and a curb stone 303. The coordinate-converted image 203 at the right side also includes an image of the curb stone 303. The coordinate-converted image 202 at the rear side includes an image of a white line 304, a guard rail 305, and other vehicle 306. The coordinate-converted image 203 at the right side also includes an image of the guard rail 305. The coordinate-converted image 204 at the left side also includes an image of the white line 304 and the other vehicle 306.

The edge detecting function performs an edge detection in the overhead image 205 as shown in FIG. 3. The images of the curb stone 303, the guard rail 305, and the other vehicle 306 generate a deviation at respective connected parts a to d in the overhead image 205.

FIG. 1 is referred again. The three-dimensional determining function is a function of determining a presence of a three-dimensional object and its type, based on a state of an edge detected by the edge detecting function. More specifically, the three-dimensional determining function detects a presence of a three-dimensional object and determines its type, based on a state of edge deviation detected by the edge detecting function.

Figure 4:
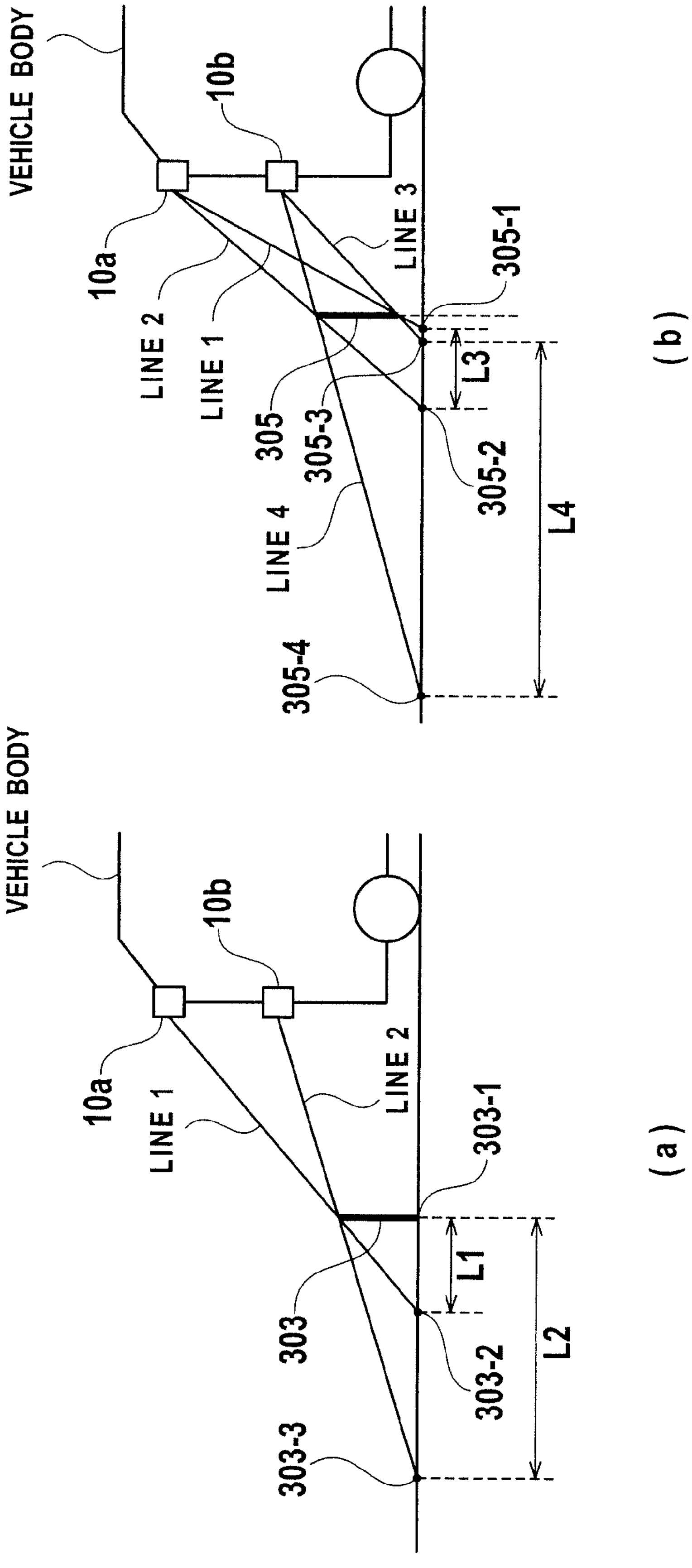
FIGS. 4(*a*) and 4(*b*) show a three-dimensional determination principle of a three-dimensional determining function of the image detecting unit shown in FIG. 1, where FIG. 4(*a*) shows a determination principle of a three-dimensional object present on a ground surface, and FIG. 4(*b*) shows a determination principle of a three-dimensional object present in the air.

FIGS. 4(*a*) and 4(*b*) show a three-dimensional determination principle of the three-dimensional determining function of the image detecting unit 54 shown in FIG. 1. FIG. 4(*a*) shows a determination principle of a three-dimensional object present on the ground surface, and FIG. 4(*b*) shows a determination principle of a three-dimensional object present in the air. In general, at the time of installing the plural camera modules 10 on a vehicle, there are constraints in the installation positions. Therefore, it is difficult to install these camera modules 10 at the same heights. As a result, the plural camera modules 10 are installed at different heights.

Assume that the first camera module 10*a* is installed at a higher position than the second camera module 10*b*, as shown in FIG. 4(*a*). In this case, the camera modules 10*a* and 10*b* recognize differently a three-dimensional object present on the ground surface, for example the curb stone 303. That is, while the camera modules 10*a* and 10*b* recognize a lower-end position of the curb stone 303 as a point 303-1, these camera modules recognize an upper-end position differently. The first camera module 10*a* recognizes the upper-end position of the curb stone 303 as a ground point 303-2 where a line 1 connecting between the first camera module 10*a* and the upper-end position of the curb stone 303 is in contact with the ground surface. On the other hand, the second camera module 10*b* recognizes the upper-end position of the curb stone 303 as a ground point 303-3 where a line 2 connecting between the second camera module 10*b* and the upper-end position of the curb stone 303 is in contact with the ground surface.

The image converting unit 53 performs a coordinate conversion by leaving the above different recognitions as they are. Therefore, as shown in FIG. 3, a positional deviation occurs in the edge of the curb stone 303, at the connected part a in the overhead image 205. That is, as shown in FIG. 4(*a*), the one coordinate-converted image expresses the curb stone 303 as an object of a distance L1 from the point 303-1 to the point 303-2, and the other coordinate-converted image expresses the curb stone 303 as an object of a distance L2 (>L1) from the point 303-1 to the point 303-3. Because the coordinate-converted images are combined in this state, a positional deviation occurs in the edge of the curb stone 303 at the connected part in the overhead image 205. Because the lower-end position 303-1 of the curb stone 303 is in contact with the ground surface, there occurs no deviation in the edge.

Further, as shown in FIG. 4(*b*), the camera modules 10*a* and 10*b* recognize differently a three-dimensional object present in the air, for example the guard rail 305. That is, the camera modules 10*a* and 10*b* recognize differently a lower-end position and an upper-end position of the guard rail 305. The first camera module 10*a* recognizes the lower-end position of the guard rail 305 as a ground point 305-1 where the line 1 connecting between the first camera module 10*a* and the lower-end position of the guard rail 305 is in contact with the ground surface. The first camera module 10*a* recognizes the upper-end position of the guard rail 305 as a ground point 305-2 where the line 2 connecting between the first camera module 10*a* and the upper-end position of the guard rail 305 is in contact with the ground surface. On the other hand, the second camera module 10*b* recognizes the lower-end position of the guard rail 305 as a ground point 305-3 where a line 3 connecting between the second camera module 10*b* and the lower-end position of the guard rail 305 is in contact with the ground surface. The second camera module 10*b* recognizes the upper-end position of the guard rail 305 as a ground point 305-4 where a line 4 connecting between the second camera module 10*b* and the upper-end position of the guard rail 305 is in contact with the ground surface.

The image converting unit 53 performs a coordinate conversion by leaving the above different recognitions as they are. Therefore, as shown in FIG. 3, a positional deviation occurs in the edge of the guard rail 305, at the connected part b in the overhead image 205. That is, as shown in FIG. 4(*a*), the one coordinate-converted image expresses the guard rail 305 as an object of a distance L3 from the point 305-1 to the point 305-2, and the other coordinate-converted image expresses the guard rail 305 as an object of a distance L4 (>L3) from the point 305-3 to the point 305-4. Because the coordinate-converted images are combined in this state, a positional deviation occurs between both edges at the connected part in the overhead image 205.

The three-dimensional determining function determines whether edges are parts of a three-dimensional object, from a state of the edge striding over the connected parts a to d in the overhead image 205 obtained by combining the coordinate-converted images 201 to 204, among the edges detected by the edge detecting function. When it is determined that the edges are parts of a three-dimensional object, the three-dimensional determining function determines whether the three-dimensional object is present on the ground surface, present in the air, or present both on the ground surface and in the air, based on a difference obtained from the state as shown in FIGS. 4(*a*) and 4(*b*).

FIG. 1 is referred again. The CPU 55 controls the whole of the image processing device 50, and controls the image converting unit 53 and the image detecting unit 54. The CPU 55 includes various devices such as an ASIC (Application Specific Integrated Circuit), and LSI (Large Scale Integrated Circuit), an FPGA (Field Programmable Gate Array), and a DSP (Digital Signal Processor), for example.

The output buffer 56 stores an overhead image which is obtained by coordinate conversion by the image converting unit 53. This output buffer 56 outputs information of the stored overhead image to the monitor 60.

The monitor 60 displays the overhead image obtained by the coordinate conversion. When the image detecting unit 54 determines that the edges at the connection parts a to d are parts of a three-dimensional object, the monitor 60 highlights this three-dimensional object. In this case, the monitor 60 superimposes an overlay image with the three-dimensional object on the overhead image, and highlights this three-dimensional object.

When the image detecting unit 54 determines that the edges at the connected parts a to d are parts of a three-dimensional object, the speaker 70 informs the driver about the presence of this three-dimensional object, using a predetermined sound. Specifically, the speaker 70 informs the driver about the presence of the three-dimensional object using a beep sound such as "beep, beep, beep" or using a speech sound such as "there is an obstacle on the left".

The outline of the operation of the vehicle circumferential image providing device 1 according to the present embodiment is explained next. First, the plural camera modules 10 image the circumference of the own vehicle. Next, the image converting unit 53 generates plural coordinate-converted images by coordinate-converting the images picked up with the camera modules 10, and generates an overhead image by combining the generated coordinate-converted images.

Thereafter, the image detecting unit 54 detects edges in the overhead image 205 using the edge detecting function. After detecting edges, the image detecting unit 54 extracts the edges striding over the connected parts a to d. Next, the image detecting unit 54 extracts edges having deviations from the edges striding over the connected parts a to d. That is, by extracting edges having deviations from the edges striding over the connected parts a to d, the image detecting unit 54 determines whether the extracted edges are parts of a three-dimensional object.

The image detecting unit 54 determines whether the extracted edges that are determined to be the edges of a three-dimensional object are the parts of the same object. The image detecting unit 54 performs this determination of whether the edges are the parts of the same object, because edges of different three-dimensional objects are sometimes expressed by chance to stride over the connected parts a to d in the overhead image 205. In this case, the image detecting unit 54 extracts the coordinate-converted images 201 to 204 constituting the connected parts a to d over which the edges stride. The image detecting unit 54 compares brightness or color information of three-dimensional objects in the coordinate-converted images 201 to 204, and determines whether the three-dimensional objects in the coordinate-converted images 201 to 204 are the same object.

When it is determined that the three-dimensional objects are the same object, the image detecting unit 54 determines whether the three-dimensional object is present on the ground surface, or present in the air, or present both on the ground surface and in the air. The image detecting unit 54 determines a type of these present types based on the following.

First, when it is determined that the edges striding over the connected parts a to d are parts of a three-dimensional object, the image detecting unit 54 determines that the three-dimensional object is present on the ground surface, when the edges at the near side of the own vehicle in each coordinate-converted image are continuous at the connected parts a to d.

That the edges at the near side of the own vehicle in each coordinate-converted image are continuous at the connected parts a to d indicates that the edges at the near side of the own vehicle are present on the ground surface. That is, as shown by the curb stone 303 in FIG. 3, because coordinate conversion is performed using the ground surface as a reference surface, no positional deviation occurs in the edges present on the ground surface. Therefore, the image detecting unit 54 determines that a three-dimensional object is present on the ground surface in the above case.

When it is determined that the edges at the connected parts a to d are parts of a three-dimensional object, the image detecting unit 54 determines that the three-dimensional object is present in the air when the edges at the near side of the own vehicle in each coordinate-converted image are not continuous at the connected parts a to d and also when the edges at the near side of the own vehicle form a straight line or a curve having no inflected point.

That the edges at the near side of the own vehicle in each coordinate-converted image are not continuous indicates that the edges at the near side of the own vehicle are not present on the ground surface. That is, because the present device 1 performs coordinate conversion using the ground surface as a reference surface, there occurs no positional deviation in the connected parts of edges present on the ground surface such as the curb stone 303 shown in FIG. 3. That a positional deviation occurs in the connected parts a to d indicates that the edges are present in the air such as the guard rail 305 shown in FIG. 3. That the edges at the near side of the own vehicle form a straight line or a curve having no inflected point has a high probability that two or more objects such as tires and the vehicle body of the other vehicle 306 do not constitute the edges, but one object constitutes the edges. Therefore, there is a small possibility that these edges indicate a mixture of a three-dimensional object (such as tires) present on the ground surface and a three-dimensional object (such as a vehicle body) present in the air. Consequently, the image detecting unit 54 determines that the three-dimensional object is present in the air, in the above case.

When it is determined that the edges at the connected parts a to d are parts of a three-dimensional object, the image detecting unit 54 determines that the three-dimensional object is both present on the ground surface and present in the air (hereinafter, called a mixture object), when the edges at the near side of the own vehicle are not continuous at the connected parts a to d and also when at least one of the edges at the near side of the own vehicle has an inflected point.

That the edges at the near side of the own vehicle in each coordinate-converted image are not continuous at the connected parts a to d indicates that the edges at the near side of the own vehicle are not present on the ground surface. That is, that a positional deviation occurs at the connected parts a to d indicates that the edges are present in the air, such as vehicle parts of the other vehicle 306 shown in FIG. 3. That at least one of the edges at the near side of the own vehicle has an inflected point indicates that the edges have a high possibility of being configured by two or more objects such as the tires of the other vehicle 306 and the vehicle body. There is also a high possibility that the three-dimensional object is a mixture of a three-dimensional object (tires) present on the ground surface and a three-dimensional object (the vehicle body) present in the air. In this case, because the edges of the vehicle body stride over the connected parts a to d and because the inflected point is present, the vehicle body is considered to be supported by tires. Therefore, the image detecting unit 54 determines that the three-dimensional object is a mixture object.

As explained above, after the image detecting unit 54 determines a type of a three-dimensional object, the image converting unit 53 corrects the overhead image 205 corresponding to the type of the three-dimensional object. In this case, the image converting unit 53 corrects the image so as to cancel the deviation of the edges striding over the connected parts a to d. Further, the monitor 60 highlights the three-dimensional object, and notifies the presence of the three-dimensional object to the driver with a predetermined sound.

Figure 5:
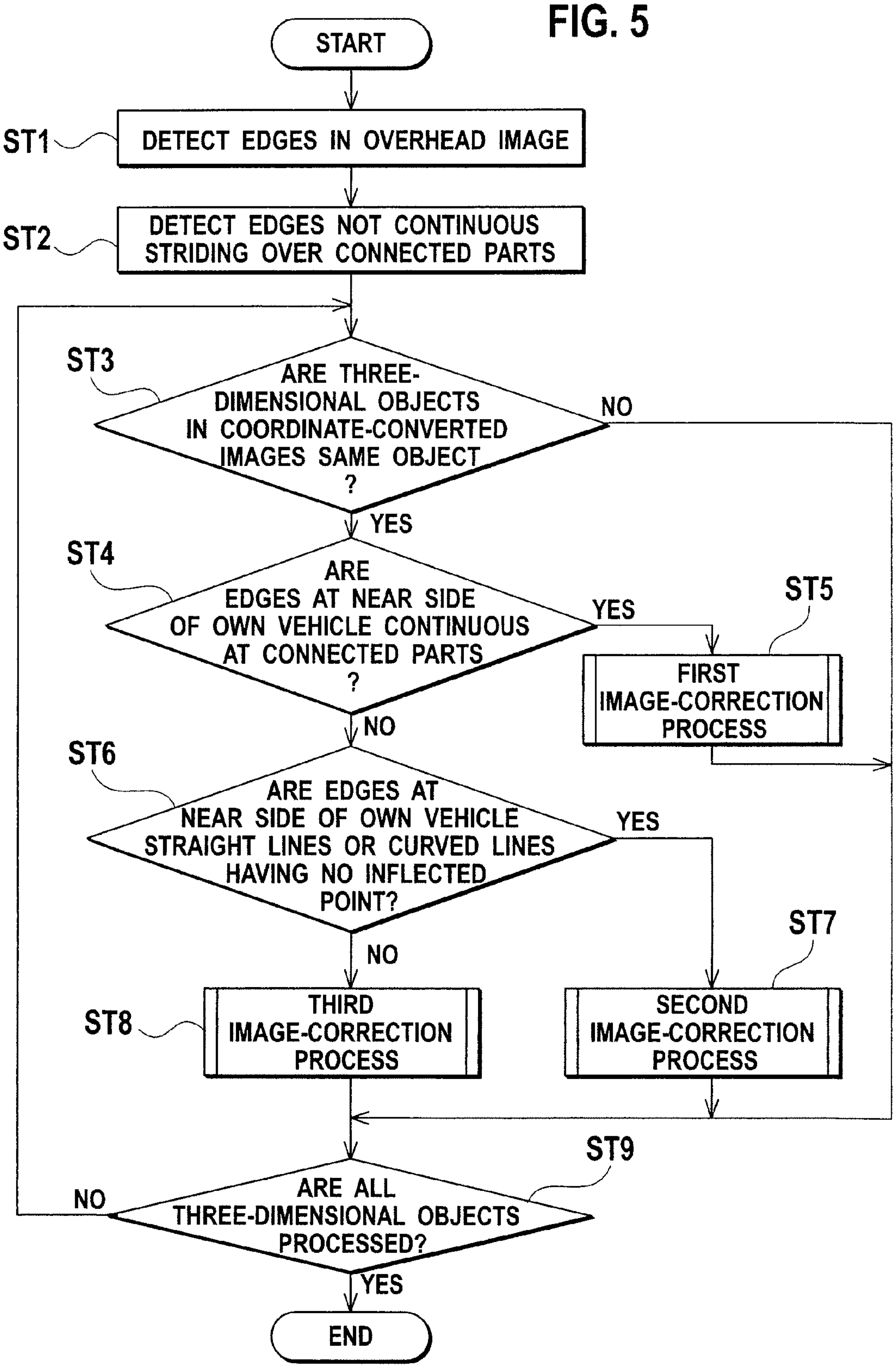
FIG. 5 is a flowchart showing a detailed operation of the vehicle circumferential image providing device according to the first embodiment.

Next, a detailed operation of the vehicle circumferential image providing device 1 according to the present embodiment is explained. FIG. 5 is a flowchart showing a detailed operation of the vehicle circumferential image providing device 1 according to the first embodiment. After the image converting unit 53 generates the overhead image 205, the image detecting unit 54 performs the edge detection in the overhead image 205, as shown in FIG. 5 (ST1). Alternatively, the edge detection can be performed to the images picked up with the camera modules 10, and these images can be coordinate-converted, separately from the above operation.

Next, the image detecting unit 54 detects edges (that generate a deviation) that are discontinuous striding over the connected parts a to d (ST2). As a result, the image detecting unit 54 detects a three-dimensional object.

Figure 6:
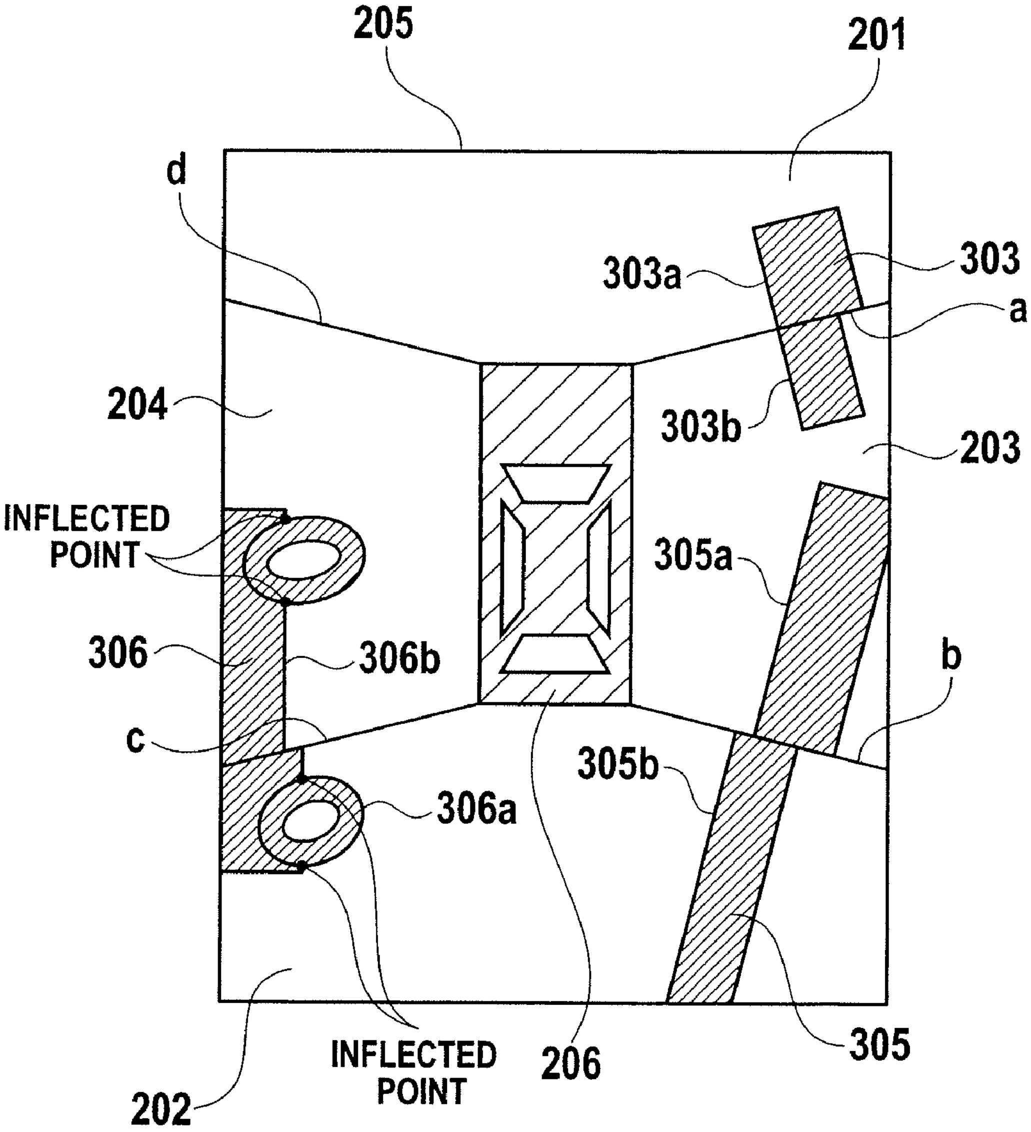
FIG. 6 shows a three-dimensional object detected by a process at ST2 shown in FIG. 5.

FIG. 6 shows a three-dimensional object detected by the process at ST2 shown in FIG. 5. As shown in FIG. 6, the curb stone 303, the guard rail 305, and the other vehicle 306 are detected, by the process at step ST2. As is clear from the comparison with the overhead image 205 shown in FIG. 3, the wall 301 and the pole 302 do not stride over the connected parts a to d, and therefore, the wall 301 and the pole 302 are not detected in the process at step ST2. While the white line 304 strides over the connected part c, the white line 304 is not detected in the process at step ST2, because no positional deviation occurs in the edge.

FIG. 5 is referred again. After step ST2, the image detecting unit 54 specifies one of three-dimensional objects. That is, in the example shown in FIG. 6, the image detecting unit 54 selects one of the curb stone 303, the guard rail 305 and the other vehicle 306, and performs the process of the subsequent steps ST3 to ST9.

After selecting one of the three-dimensional objects, the image detecting unit 54 compares brightness or color information of the three-dimensional object in each of the coordinate-converted images 201 to 204 where this three-dimensional object strides over, and determines whether the three-dimensional objects in the coordinate-converted images 201 to 204 are the same object (ST3). With this arrangement, different three-dimensional objects are prevented from being determined as the same object, even if the edges of the different three-dimensional objects are expressed to stride over the connected parts a to d by chance in the overhead image 205.

When it is determined that the three-dimensional objects in the coordinate-converted images 201 to 204 are not the same object (ST3: NO), the process proceeds to step ST9. On the other hand, when the three-dimensional objects in the coordinate-converted images 201 to 204 are determined as the same object (ST3: YES), the image detecting unit 54 determines whether the edges of this three-dimensional object at the near side of the own vehicle are continuous (ST4).

When it is determined that the edges of the three-dimensional object at the near side of the own vehicle are continuous (ST4: YES), the image detecting unit 54 determines that the three-dimensional object is present on the ground surface. That is, because edges 303*a* and 303*b* of the three-dimensional object at the near side of the own vehicle are continuous such as the curb stone 303 shown in FIG. 6, the image detecting unit 54 determines that the three-dimensional object is present on the ground surface.

Thereafter, the image converting unit 53 performs a first image-correction process, thereby correcting the overhead image (ST5), and the process proceeds to step ST9. On the other hand, when it is determined that the edges of the three-dimensional object at the near side of the own vehicle are not continuous (ST4: NO), the image detecting unit 54 determines whether the edges of the three-dimensional object at the near side of the own vehicle form a straight line or a curve having no inflected point (ST6).

When it is determined that the edges of the three-dimensional object at the near side of the own vehicle form a straight line or a curve having no inflected point (ST6: YES), the image detecting unit 54 determines that the three-dimensional object is present in the air. That is, because edges 305*a* and 305*b* of the three-dimensional object at the near side of the own vehicle are not continuous such as the guard rail 305 shown in FIG. 6, the image detecting unit 54 determines that the three-dimensional object is present in the air. Particularly, because both the edges 305*a* and 305*b* form a straight line or a curve having no inflected point, the three-dimensional object cannot be easily considered as a mixed. Accordingly, the image detecting unit 54 determines that the three-dimensional object is present in the air.

Thereafter, the image converting unit 53 performs a second image-correction process, thereby correcting the overhead image (ST7), and the process proceeds to step ST9. On the other hand, when it is determined that the edges of the three-dimensional object at the near side of the own vehicle form a straight line or a curve having an inflected point (ST6: NO), the image detecting unit 54 determines that the three-dimensional object is a mixture object. That is, because edges 306*a* and 306*b* of the three-dimensional object at the near side of the own vehicle are not continuous such as the other vehicle 306 shown in FIG. 6, the three-dimensional object can be determined to be present in the air. However, because the edges 306*a* and 306*b* include inflected points, this three-dimensional object has a high possibility of being a mixture object including two or more three-dimensional objects. Therefore, the image detecting unit 54 determines that the three-dimensional object is a mixture object.

Thereafter, the image converting unit 53 performs a third image-correction process, thereby correcting the overhead image (ST8), and the process proceeds to step ST9. At step ST9, the image detecting unit 54 determines whether all three-dimensional objects are processed (ST9). When it is determined that not all three-dimensional objects are processed (ST9: NO), the image detecting unit 54 selects an unprocessed three-dimensional object, and the process proceeds to step ST3. On the other hand, when it is determined that all three-dimensional objects are processed (ST9: YES), the process shown in FIG. 5 ends.

Figure 7:
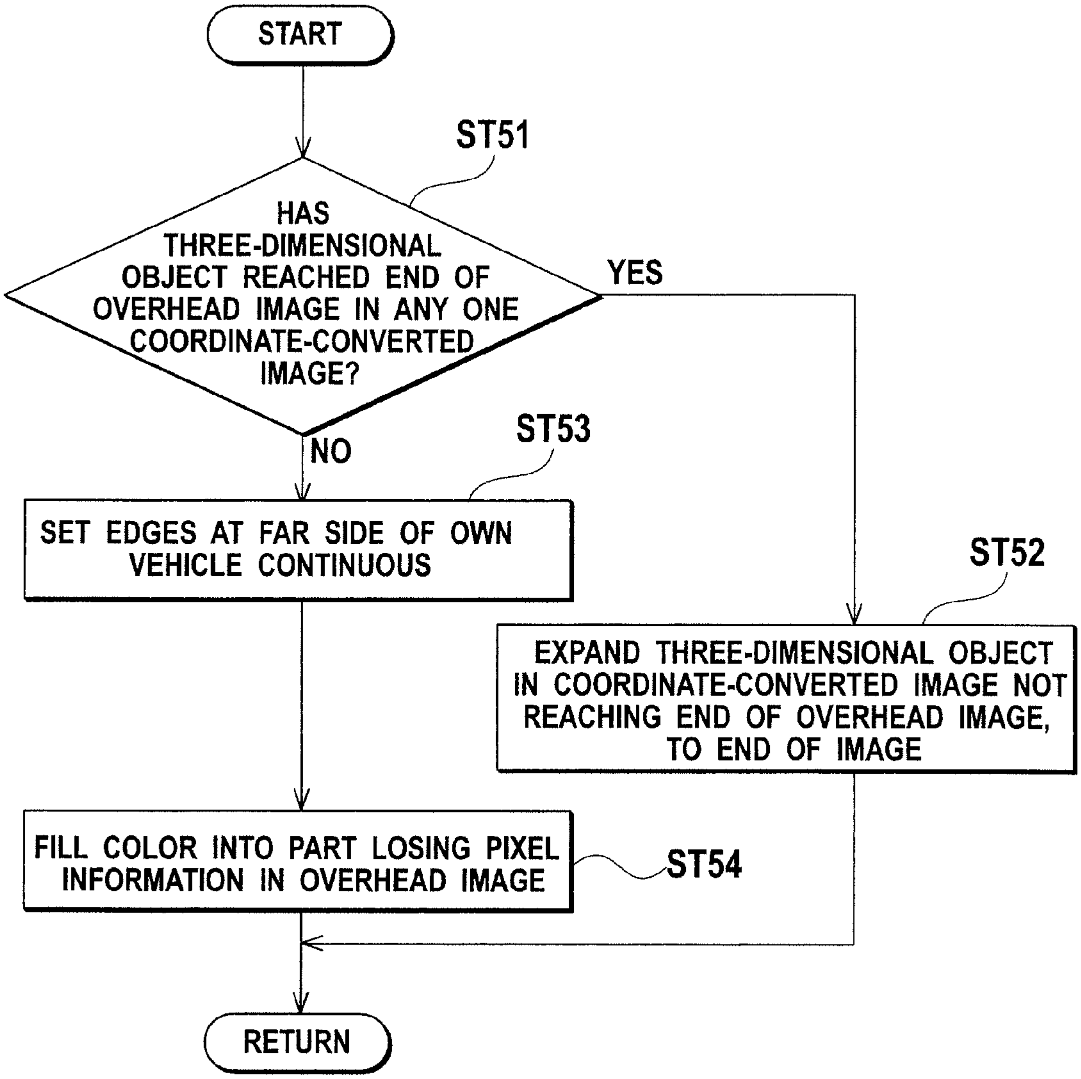
FIG. 7 is a flowchart showing the details of a first image-correction process (ST5) shown in FIG. 5.

Details of the process performed by the first image-correction process (ST5) shown in FIG. 5 are explained next. FIG. 7 is a flowchart showing the details of the first image-correction process (ST5) shown in FIG. 5. First, in the first image-correction process, the image converting unit 53 determines whether the three-dimensional object reaches the end of the overhead image 205 in any one of the coordinate-converted images (ST51).

When the three-dimensional object reaches the end of the overhead image 205 in any one of the coordinate-converted images (ST51: YES), the image converting unit 53 performs an expansion process to a three-dimensional object in a coordinate-converted image not reaching the end of the overhead image 205, so that the three-dimensional object also reaches the end of the overhead image 205 (ST52). Thereafter, the process shifts to step ST9 shown in FIG. 5.

Figure 8:
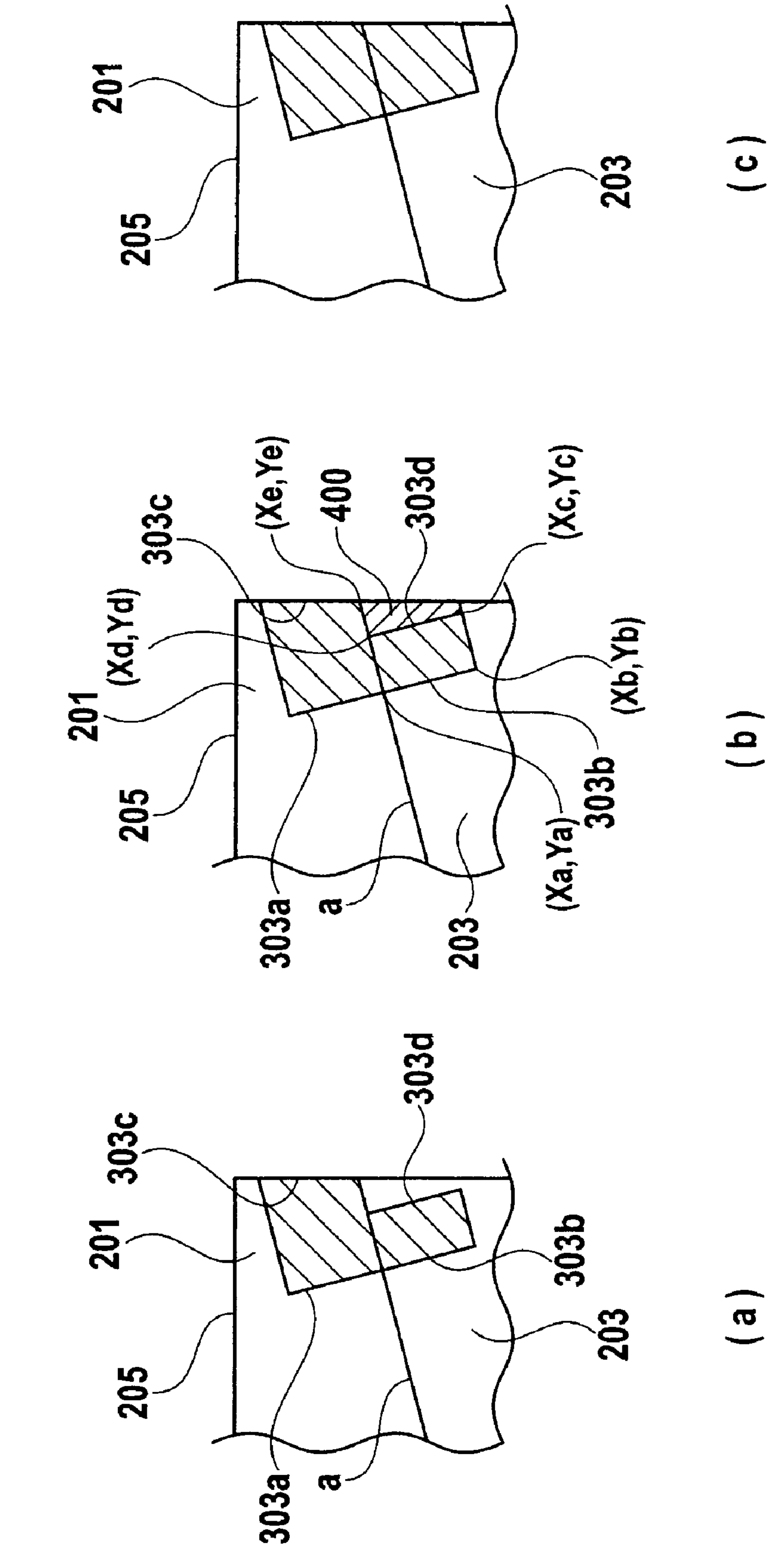
FIG. 8 show details of a process at step ST52 shown in FIG. 7, where FIG. 8(*a*) shows an image before performing the process at step ST52, FIG. 8(*b*) shows an image at the time of performing the process at step ST52, and FIG. 8(*c*) shows an image after performing the process at step ST52.

FIG. 8 show details of the process at step ST5 shown in FIG. 7, where FIG. 8(*a*) shows an image before performing the process at step ST52, FIG. 8(*b*) shows an image at the time of performing the process at step ST52, and FIG. 8(*c*) shows an image after performing the process at step ST52. FIG. 8 also shows an image when the curb stone 303 is processed.

As shown in FIG. 8(*a*), the edges 303*a* and 303*b* of the curb stone 303 at the near side of the own vehicle are continuous, and the edges 303*c* and 303*d* at the far side of the own vehicle are not continuous. Further, the edge 303*c* of the curb stone 303 at the far side of the own vehicle in one coordinate-converted image 201 reaches the end of the overhead image 205. Therefore, in the process at step ST52, the image converting unit 53 performs an expansion process to the curb stone 303 in the coordinate-converted image 203 not reaching the end of the overhead image 205, so that the curb stone also reaches the end of the overhead image 205.

In this case, the image converting unit 53 plots pixels from the edge 303*d* at the far side of the own vehicle in the coordinate-converted image 203 not reaching the end of the overhead image 205 to the end of the overhead image 205. In this case, the image converting unit 53 plots the pixels to a direction perpendicular to the edge 303*b* at the near side of the own vehicle.

In place of the above process, the image converting unit 53 obtains a region 400 encircled by a straight line passing coordinates (Xb, Yb) and coordinates (Xc, Yc), the edge 303*d*, the connected part a, and the end of the overhead image 205, and fills in this region 400.

Further, in place of the above process, the image converting unit 53 obtains a ratio of a length of a line connecting between coordinates (Xa, Ya) and coordinates (Xe, Ye) of the connected part a to a length of a line connecting between the coordinates (Xa, Ya) and coordinates (Xd, Yd) of the connected part a. The image converting unit 53 then expands pixels of the curb stone 303 in the coordinate-converted image 203 to a direction perpendicular to the edge 303*b* at the near side of the own vehicle, corresponding to a ratio of the lengths.

In any one of the above processes, the overhead image 205 is processed to fill in the region 400 shown in FIG. 8(*b*). As shown in FIG. 8(*c*), the curb stone 303 in both coordinate-converted images 201 and 203 is processed to reach the end of the overhead image 205. With this arrangement, the driver can easily recognize that the three-dimensional objects are the same object when referring to the overhead image 205 in the monitor 60.

FIG. 7 is referred again. When it is determined that the three-dimensional object in neither of the coordinate-converted image reaches the end of the overhead image 205 (ST51: NO), the image converting unit 53 processes the overhead image so that the edges of the three-dimensional images at the far side of the own vehicle in each coordinate-converted image are continuous at the connected parts a to d (ST53). Thereafter, the image converting unit 53 fills a predetermined color into the part losing pixel information in the overhead image 205 by the process at step ST53 (ST54). Thereafter, the process shifts to the step ST9 shown in FIG. 5.

Figure 9:
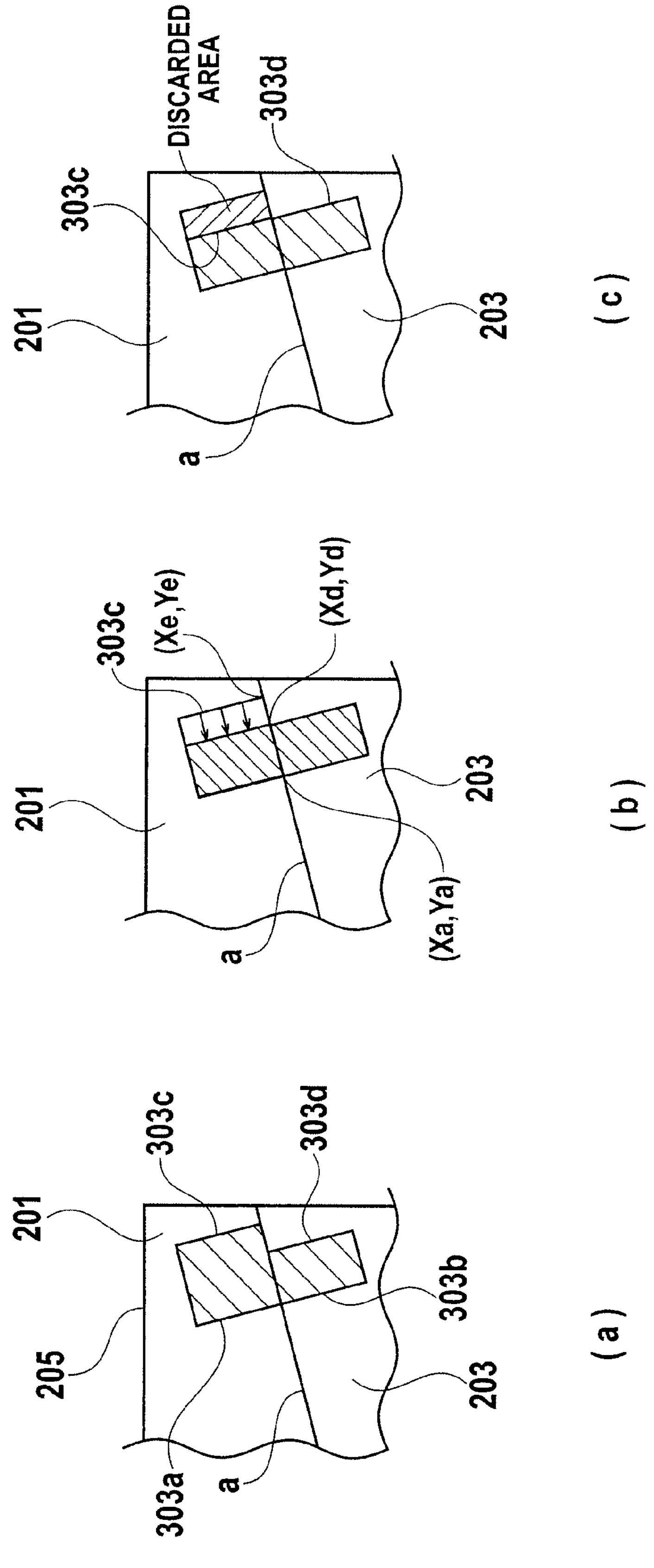
FIG. 9 show details of processes at step ST53 and step ST54 shown in FIG. 7, where FIG. 9(*a*) shows an image before performing the process at step ST53, FIG. 9(*b*) shows an image after performing the process at step ST53, and FIG. 9(*c*) shows an image after performing the process at step ST54.

FIG. 9 show details of the processes at step ST53 and step ST54 shown in FIG. 7, where FIG. 9(*a*) shows an image before performing the process at step ST53, FIG. 9(*b*) shows an image after performing the process at step ST53, and FIG. 9(*c*) shows an image after performing the process at step ST54. FIG. 9 shows the image when the curb stone 303 is processed.

As shown in FIG. 9(*a*), the edges 303*a* and 303*b* of the curb stone 303 at the near side of the own vehicle are continuous, and the edges 303*c* and 303*d* at the far side of the own vehicle are not continuous. Therefore, in the process at step ST53, the image converting unit 53 performs a process to make the edges 303*c* and 303*d* at the far side continuous at the connected part a.

In this case, the image converting unit 53 performs a shift process to shift the edge in the overhead image. That is, the image converting unit 53 calculates a distance from the coordinates (Xe, Ye) to the coordinates (Xd, Yd), and shifts the edge 303*c* at the far side of the own vehicle in the coordinate-converted image 201, by the above distance (FIG. 9(*b*)). The image converting unit 53 discards a three-dimensional part far from the edge 303*c* after the shifting, that is, pixel data in a discard area shown in FIG. 9(*c*).

In place of the above process, the image converting unit 53 performs at least one of a thinning process of thinning pixels of the three-dimensional object in the coordinate-converted image and a compression process of compressing the three-dimensional object in the coordinate-converted image. That is, the image converting unit 53 obtains a ratio of a length of the line connecting between the coordinates (Xa, Ya) and the coordinates (Xe, Ye) of the connected part a to a length of the line connecting between the coordinates (Xa, Ya) and the coordinates (Xd, Yd) of the connected part a. The image converting unit 53 then performs the thinning process of thinning pixels of the curb stone 303 in the coordinate-converted image 201, or performs the compression process of compressing the curb stone 303 in the coordinate-converted image 201.

In any one of the above processes, as shown in FIG. 9(*c*), the image converting unit 53 processes the edges 303*c* and 303*d* at the far side of both the coordinate-converted images 201 and 203 to become continuous at the connected part a, thereby enabling the user watching the overhead image 205 to easily recognize the curb stone 303. As a result, the driver can be avoided from losing a feeling of distance from the curb stone 303 when referring to the overhead image 205 in the monitor 60.

Thereafter, the image converting unit 53 performs any one of the shift process, the thinning process, and the compression process, and performs the process of filling a predetermined color into the part (the discard area in FIG. 9(*c*)) losing pixel information in the overhead image 205. In this case, the image converting unit 53 can express the overhead image 205, without a different feeling, by filling the same color into the part losing pixel information as the color of the ground surface. Further, the image converting unit 53 can inform the driver watching the overhead image 205 that the image is corrected, by using a color (red or blue, for example) not present on the ground surface.

In the above configuration, among the edges 303*c* and 303*d* at the far side in each coordinate-converted image, the edge 303*c* at the far position is processed to become continuous to the edge 303*d* at the near position. However, the process is not limited to this, and the edge 303*d* at the near position can be processed to become continuous to the edge 303*c* at the far position. When this process is performed, the curb stone 303 is displayed large in the overhead image 205. However, the part losing pixel information does not need to be colored like the process at step ST54. This can decrease a possibility that the colored overhead image 205 becomes unnatural. Because the process at step ST54 is not necessary, the process can be simplified.

Figure 10:
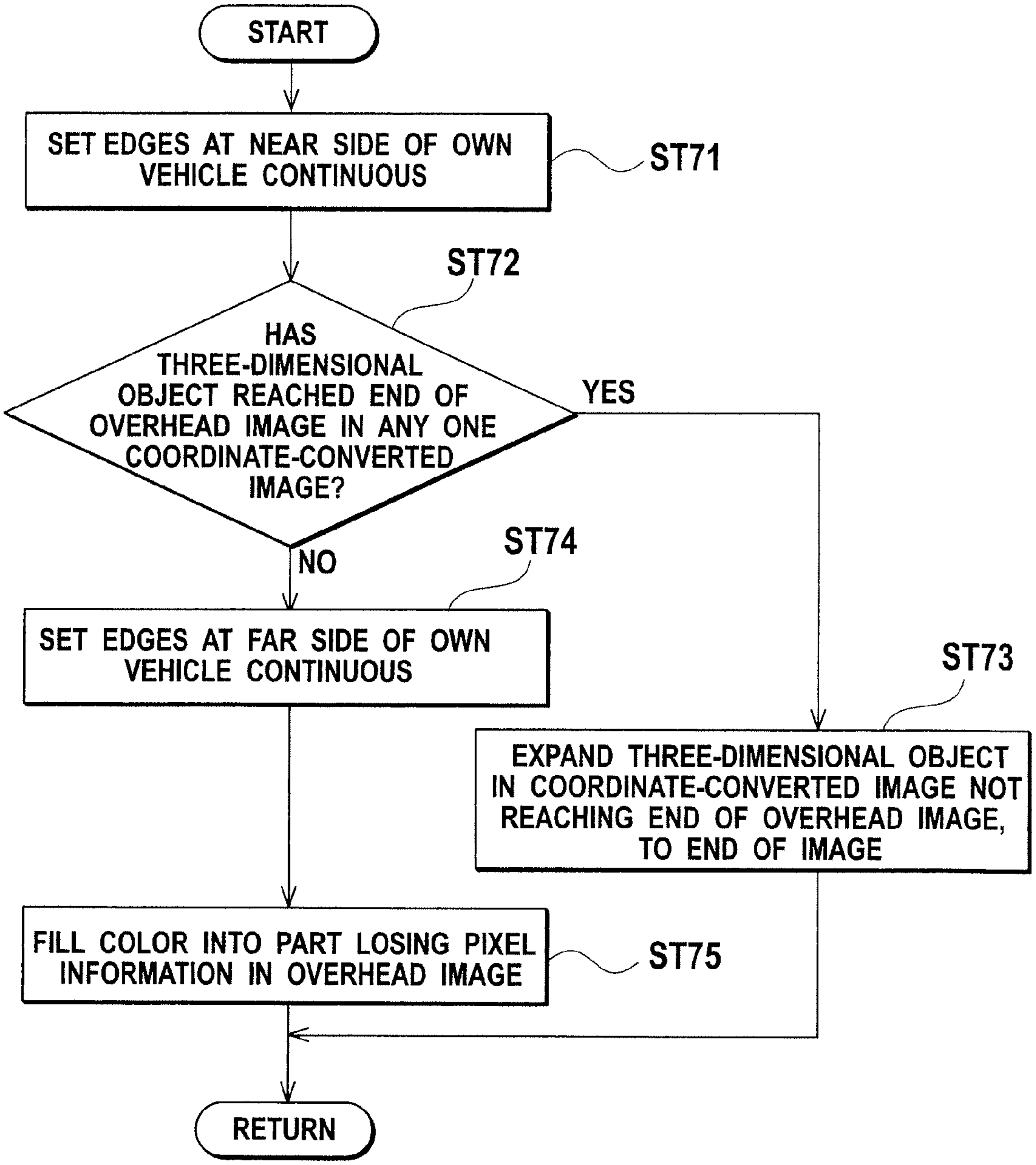
FIG. 10 is a flowchart showing details of a second image-correction process (ST7) shown in FIG. 5.

Details of the process at the second image-correction process (ST7) shown in FIG. 5 are explained. FIG. 10 is a flowchart showing the details of the second image-correction process (ST7) shown in FIG. 5. First, in the second image-correction process, the image converting unit 53 processes the edges at the near side of the own vehicle in each coordinate-converted image to become continuous (ST71). In this case, the image converting unit 53 compares the edges of the three-dimensional objects at the near side of the own vehicle in each coordinate-converted image. The image converting unit 53 shifts the three-dimensional object in the coordinate-converted image so that the edge at the far side of the own vehicle, among the compared edges, becomes continuous with the edge at the near side of the own vehicle, at the connected parts a to d.

Figure 11:
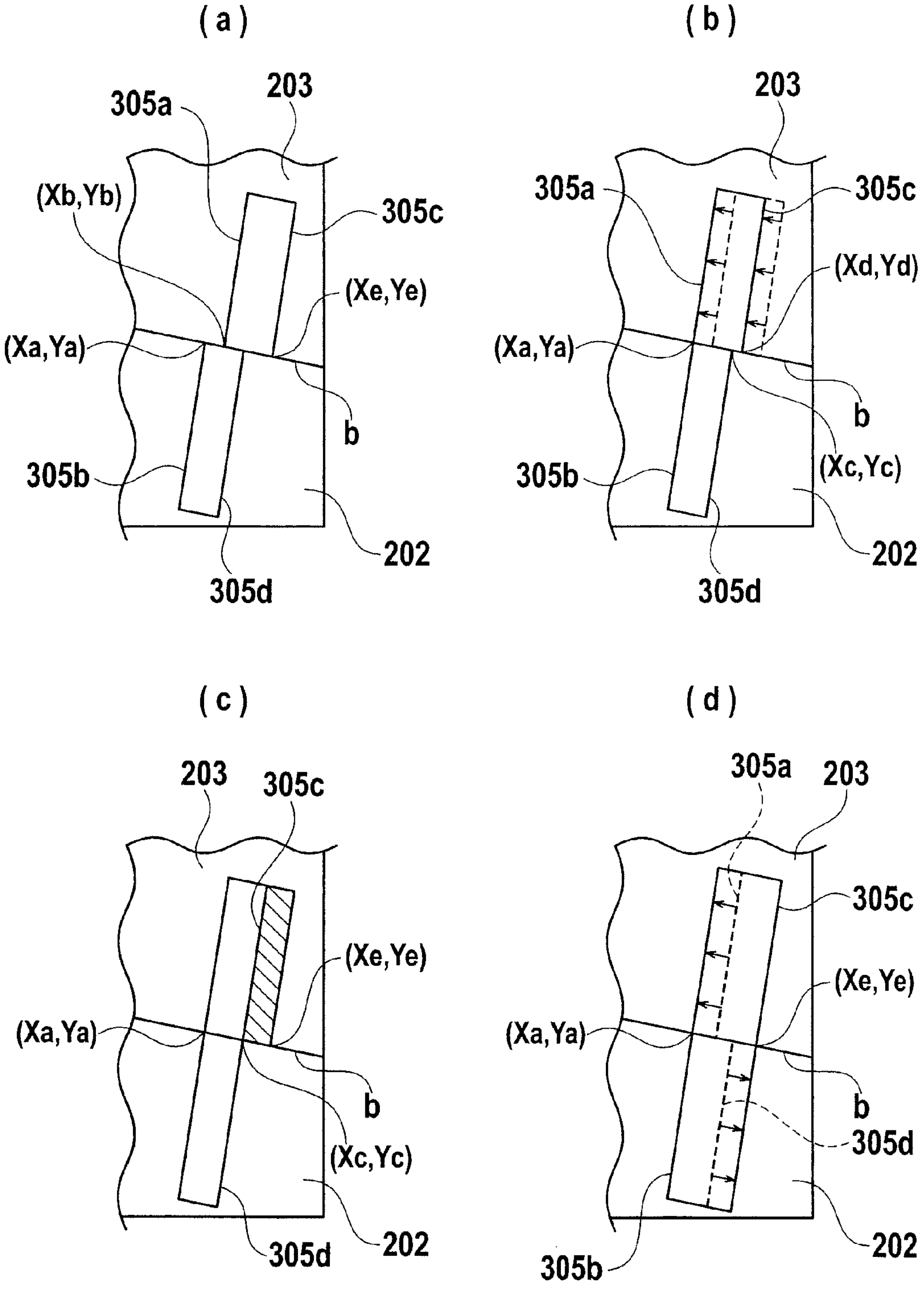
FIG. 11 show details of the flowchart shown in FIG. 10, where FIG. 11(*a*) shows an image of a guard rail before performing the process shown in FIG. 10, FIG. 11(*b*) shows an image of the guard rail after performing the process at step ST71, FIG. 11(*c*) shows a first image of the guard rail after performing the process at step ST71, and FIG. 11(*d*) shows a second image of the guard rail after performing the process at step ST71.

FIG. 11 show details of the flowchart shown in FIG. 10, where FIG. 11(*a*) shows an image of the guard rail 305 before performing the process shown in FIG. 10, FIG. 11(*b*) shows an image of the guard rail 305 after performing the process at step ST71, FIG. 11(*c*) shows a first image of the guard rail 305 after performing the process at step ST71, and FIG. 11(*d*) shows a second image of the guard rail 305 after performing the process at step ST71.

As shown in FIG. 11(*a*), the edges 305*a* and 305*b* of the three-dimensional object at the near side of the own vehicle present in the air, such as the guard rail 305, are not continuous. Therefore, the image converting unit 53 processes the edges 305*a* and 305*d* at the near side of the own vehicle to become continuous, in the process at step ST71.

In this case, the image converting unit 53 calculates a distance from the coordinates (Xb, Yb) to the coordinates (Xa, Ya) shown in FIG. 11(*a*), and shifts the guard rail 305 by this distance in the coordinate-converted image 203 (FIG. 11(*b*)). Accordingly, among the edges 305*a* and 305*b* at the near side of the own vehicle, the edge 305*a* at the far position is matched with the edge 305*b* at the near position. As a result, both edges 305*a* and 305*b* become continuous at the connected part b.

By matching the far edge 305*a* with the near edge 305*b*, a more proper expression is performed. That is, when the near edge 305*b* is matched with the far edge 305*a*, the overhead image 205 expresses the guard rail 305 as if the guard rail 305 is present far from the actual position of the guard rail 305. Therefore, this has a risk of generating an unexpected contact of the guard rail with the vehicle. Consequently, by matching the far edge 305*a* with the near edge 305*b*, the overhead image 205 expresses that the guar rail 305 is present near the own vehicle, thereby preventing the vehicle from generating an unexpected contact with the guard rail.

FIG. 10 is referred again. As described above, after processing the edges at the near side of the own vehicle in each coordinate-converted image to become continuous, the image converting unit 53 determines whether the three-dimensional object in any one of the coordinate-converted images reaches the end of the overhead image 205 (ST72). When it is determined that the three-dimensional object in any one of the coordinate-converted images reaches the end of the overhead image 205 (ST72: YES), the image converting unit 53 performs the expansion process so that the three-dimensional object in the coordinate-converted image not reaching the end of the overhead image 205 also reaches the end of the overhead image 205 (ST73). Thereafter, the process shifts to step ST9 shown in FIG. 5. The process at step ST73 is the same as that at step ST52 shown in FIG. 7, and therefore detailed explanations thereof will be omitted.

On the other hand, when it is determined that the three-dimensional object in any one of the coordinate-converted images does not reach the end of the overhead image 205 (ST72: NO), the image converting unit 53 processes the overhead image so that the edges of the three-dimensional object at the far side of the vehicle in each coordinate-converted image become continuous at the connected parts a to d, while maintaining the continuation state of the edges 305*a* and 305*b* at the near side of the own vehicle (ST74). Thereafter, the image converting unit 53 performs the process of filling a predetermined color into the part losing pixel information in the overhead image 205, by the process at step ST74. Thereafter, the process shifts to step ST9 shown in FIG. 5.

FIG. 11 is referred. Even when the edges 305*a* and 305*b* at the near side of the own vehicle are processed to be continuous by shifting the guard rail 305 in the coordinate-converted image 203 as shown in FIG. 11(*b*), the edges 305*c* and 305*d* at the far side of the own vehicle are not continuous. Specifically, contact coordinates of the edge 305*c* and the connected part b when the guard rail 305 is shifted in the coordinate-converted image 203 are (Xd, Yd). On the other hand, contact coordinates of the edge 305*d* at the far side of the own vehicle in the coordinate-converted image 202 and the connected part b are (Xc, Yc). Therefore, even if the process at step ST71 is performed, the edges 305*c* and 305*d* at the far side of the own vehicle are not continuous.

Therefore, the image converting unit 53 processes the edges 305*c* and 305*d* at the far side of the own vehicle to become continuous at step ST74. In this case, the image converting unit 53 processes the edges 305*c* and 305*d* at the far side to become continuous at the connected part b, in a similar manner to that at step ST53 shown in FIG. 7.

At step ST75, the image converting unit 53 performs any one of the shift process, the thinning process, and the compression process, and fills a predetermined color into the part (a shaded part in FIG. 11(*c*)) losing pixel information in the overhead image 205. The process at step ST75 is similar to the process at step ST54 shown in FIG. 5.

The image converting unit 53 can perform the process as shown in FIG. 11(*d*), not limited to the above process. That is, among the edges 305*a* and 305*b* at the near side in each coordinate-converted image, the image converting unit 53 processes the edge 305*a* at the far position to be continuous to the edge 305*b* at the near position. At the same time, among the edges 305*c* and 305*d* at the far side in each coordinate-converted image, the image converting unit 53 processes the edge 305*d* at the near position to be continuous to the edge 305*c* at the far position. When this process is performed, the guard rail 305 is displayed large in the overhead image 205. However, the part losing the pixel information does not need to be colored like the process at step ST75. This can decrease a possibility that the colored overhead image 205 becomes unnatural. Because the process at step ST75 is not necessary, the process can be simplified.

Figure 12:
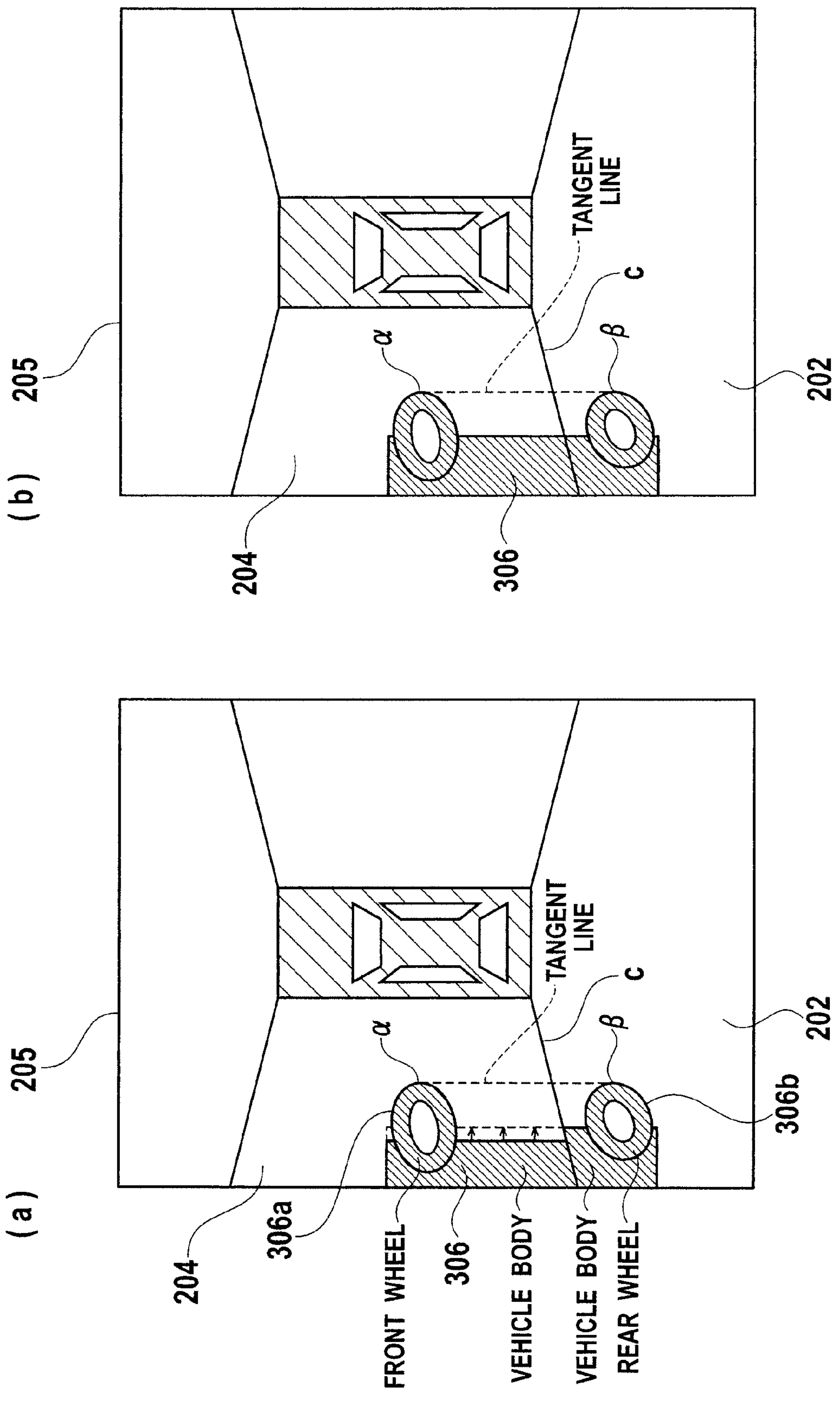
FIG. 12 show a state of a third image-correction process, where FIG. 12(*a*) shows an image before performing the third image-correction process, and FIG. 12(*b*) shows an image after performing the third image-correction process.

Details of the process at the third image-correction process (ST8) shown in FIG. 5 are explained. In the third image-correction process, a mixture object is image-processed. FIG. 12 show a state of the third image-correction process, where FIG. 12(*a*) shows an image before performing the third image-correction process, and FIG. 12(*b*) shows an image after performing the third image-correction process.

As shown in FIG. 12(*a*), the mixture object includes a three-dimensional object (tires) present on the ground surface, and a three-dimensional object (vehicle body) present in the air. The edge 306*a* at the near side of the own vehicle in one coordinate-converted image 204 includes a front wheel and the vehicle body, and the edge 306*b* at the far side of the own vehicle in the other coordinate-converted image 202 includes a rear wheel and the vehicle body.

When the process to shift the edge 306*a* is performed, for example, like the first and second image-correction processes, the edge 306*a* can be present nearer to the own vehicle than to a contact point a of the front wheel and the ground surface. That is, in the case of a mixture object, only the edge of the three-dimensional object present in the air needs to be shifted, without shifting the edge of the three-dimensional object present on the ground surface. More specifically, the edges 306*a* and 306*b* need to be processed so as not to be present at the nearer side than a tangent line connecting between the contact point α of the front wheel and the ground surface and a contact point β of the rear wheel and the ground surface. Therefore, in the third image-correction process, the edges 306*a* and 306*b* in the coordinate-converted images 202 and 204 need to be processed to be continuous as shown in FIG. 12(*b*), by shifting only the edge of the vehicle body in the coordinate-converted image 204 shown in FIG. 12(*a*).

Figure 13:
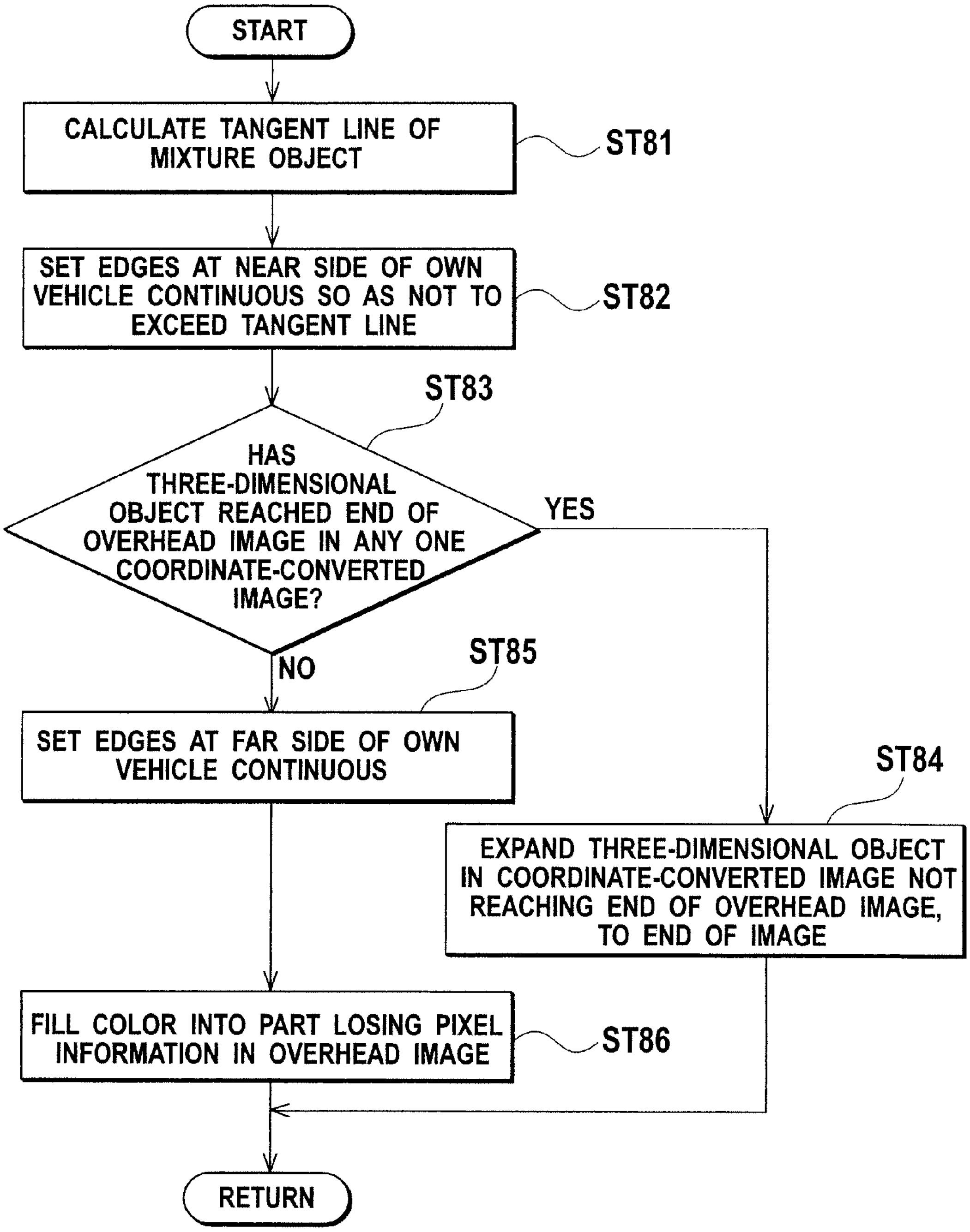
FIG. 13 is a flowchart showing details of the process of the third image-correction process (ST8) shown in FIG. 5.

FIG. 13 is a flowchart showing details of the process of the third image-correction process (ST8) shown in FIG. 5. First, in the third image-correction process, the image converting unit 53 obtains a tangent line of the mixture object (ST81).

Figure 14:
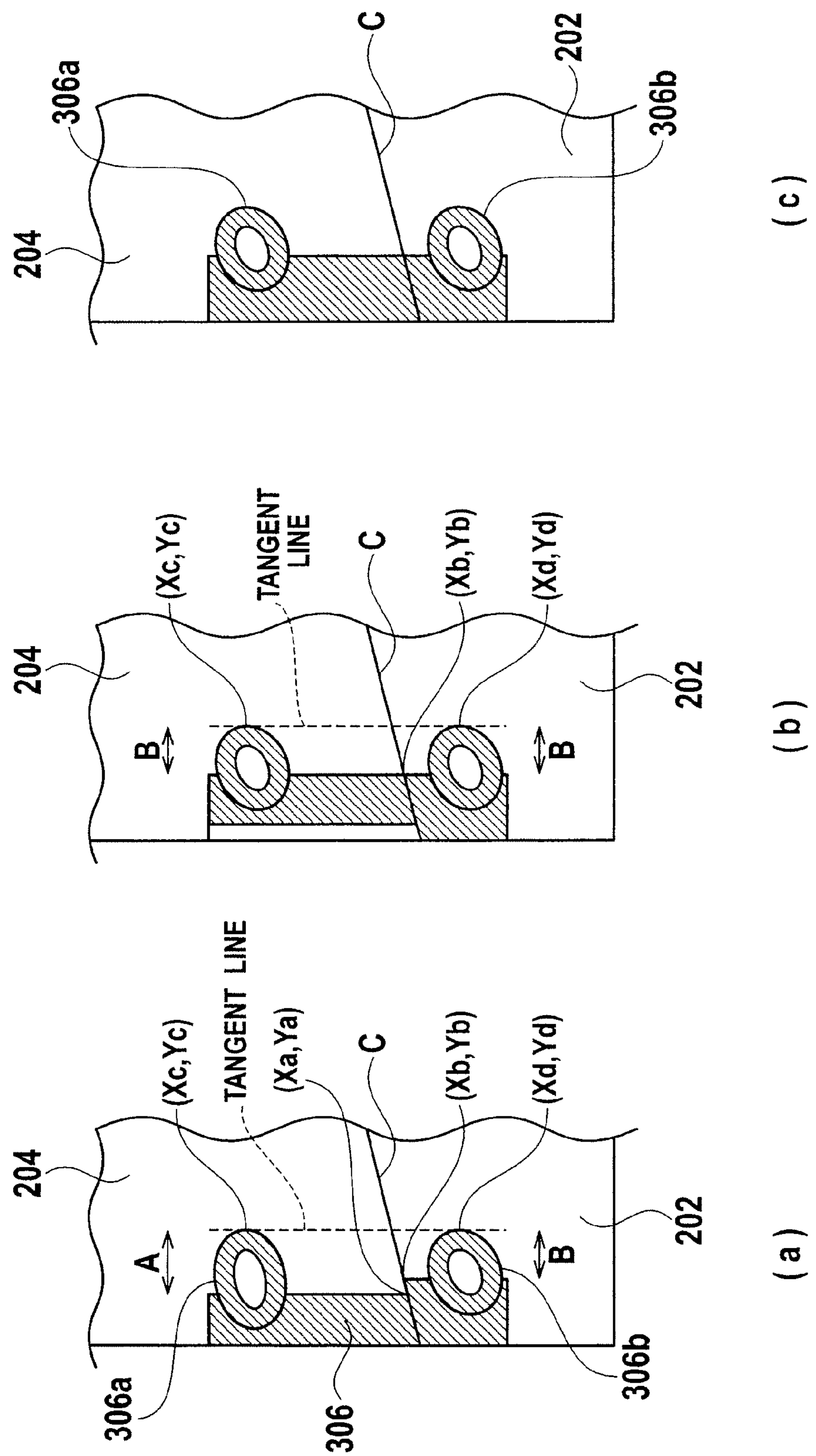
FIG. 14 show details of the flowchart shown in FIG. 13, where FIG. 14(*a*) shows an image of details at step ST8, FIG. 14(*b*) shows an image of the other vehicle after performing the process at step ST82, and FIG. 14(*c*) shows an image of the other vehicle after performing the process at step ST84.

FIG. 14 show details of the flowchart shown in FIG. 13, where FIG. 14(*a*) shows an image of the details at step ST8, FIG. 14(*b*) shows an image of the other vehicle 306 after performing the process at step ST82, and FIG. 14(*c*) shows an image of the other vehicle 306 after performing the process at step ST84.

As shown in FIG. 14(*a*), the image converting unit 53 obtains the coordinates (Xc, Ye) of the contact point of the front wheel and the ground surface, and the coordinates (Xd, Yd) of the contact point of the rear wheel and the ground surface, thereby obtaining a tangent line passing the obtained coordinates.

FIG. 13 is referred again. After obtaining the tangent line, the image converting unit 53 processes the edges at the near side of the own vehicle in each coordinate-converted image to be continuous (ST82). In this case, the image converting unit 53 compares the edges of a three-dimensional object at the near side of the own vehicle in each coordinate-converted image. The image converting unit 53 compresses the three-dimensional object on the coordinate-converted image so that the edge at the far side of the own vehicle becomes continuous to the edge at the near side of the own vehicle at the connected parts a to d, among the compared edges.

As shown in FIG. 14(*b*), because the vehicle body of the other vehicle 306 is present in the air, the edges 306*a* and 306*b* at the near side of the own vehicle are not continuous. Specifically, among these edges 306*a* and 306*b*, the edge 306*a* at the far side of the own vehicle is in contact with the connected part c at the coordinates (Xa, Ya), and the edge 306*b* at the near side of the own vehicle is in contact with the connected part c at the coordinates (Xb, Yb). Therefore, in the process at step ST82, the image converting unit 53 compresses the other vehicle 306 in the coordinate-converted image 204 so that the edges of the vehicle body become continuous. In this case, the image converting unit 53 performs the compression process so that the other vehicle 306 does not exceed the tangent line.

In performing the compression process, the image converting unit 53 obtains a distance between the tangent line and the other vehicle 306. As shown in FIG. 14(*a*), assume that a distance between the tangent line and the edge of the other vehicle 306 is A in the coordinate-converted image 204, and that a distance between the tangent line and the edge of the other vehicle 306 is B (<A) in the coordinate-converted image 202. In this case, the image converting unit 53 compresses the other vehicle 306 in the coordinate-converted image 204 to B/A times. Accordingly, as shown in FIG. 14(*b*), the distance between the edge of the vehicle body and the tangent line in the coordinate-converted images 202 and 204 becomes the same B. Both edges 306*a* and 306*b* are in contact with the connected part c at the coordinates (Xb, Yb), and the edges 306*a* and 306*b* become continuous.

FIG. 13 is referred again. As described above, after processing the edges at the near side of the own vehicle in each coordinate-converted image to become continuous, the image converting unit 53 performs the process at steps ST83 to ST86. This process is similar to the processes at steps ST51 to ST54 shown in FIG. 7, and therefore detailed explanations thereof will be omitted.

The other vehicle 306 in the coordinate-converted image 204 becomes close to the tangent line by the compression process at step ST82, and loses pixel information in some part (FIG. 14(*b*)). However, because the other vehicle 306 in the coordinate-converted image 202 reaches the end of the image, the image converting unit 53 performs the process at step ST84, thereby expanding the other vehicle 306 in the coordinate-converted image 204 to the end of the image in the overhead image 205. As a result, the expanded result is expressed as shown in FIG. 14(*c*). Even when the other vehicle 306 does not reach the end of the image, the image converting unit 53 performs the process at step ST86, and colors the part which loses pixel information.

Figure 15:
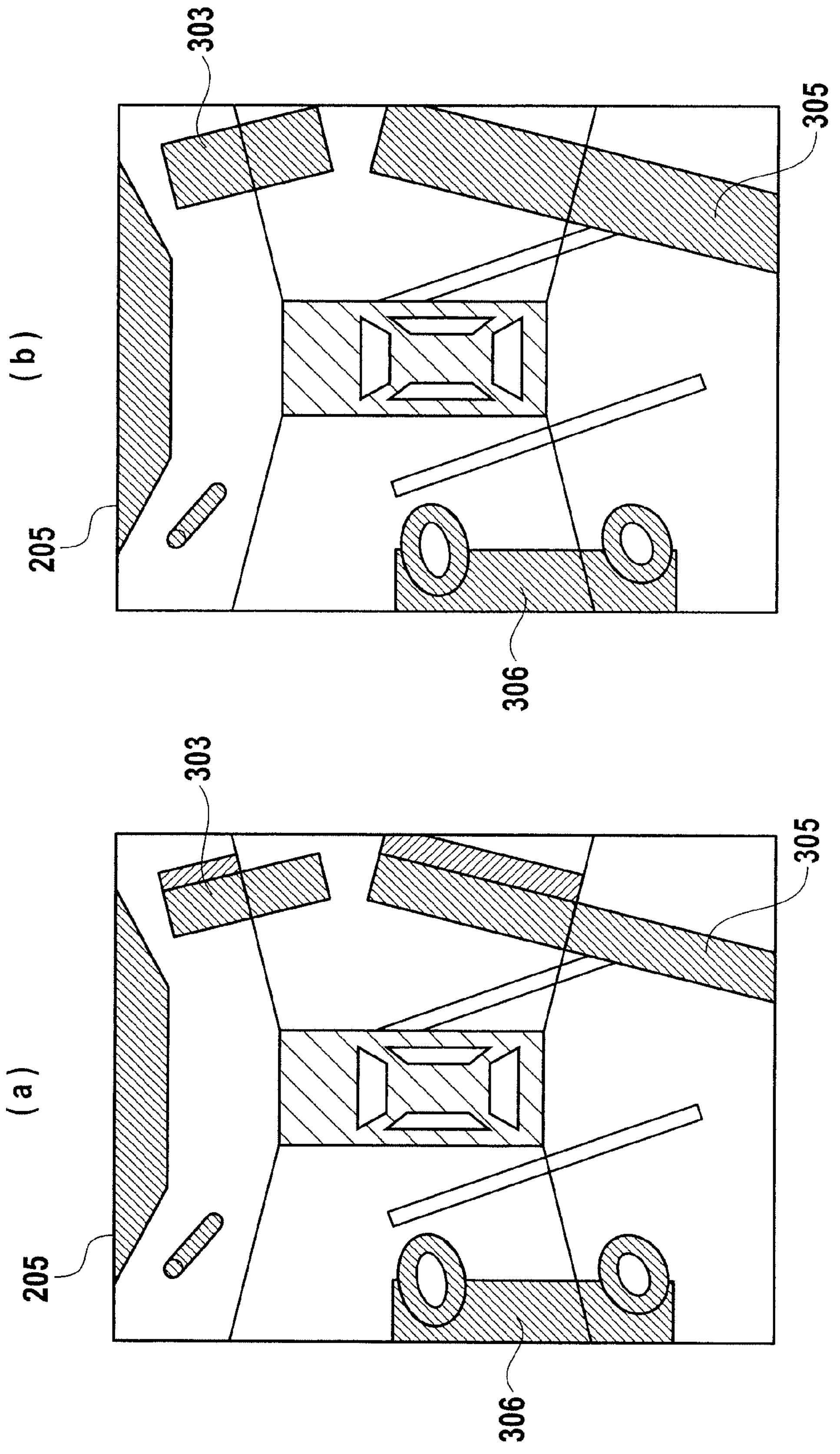
FIG. 15 show an overhead image after performing the process shown in FIG. 5, where FIG. 15(*a*) shows an example of a first overhead image, and 15(*b*) shows an example of a second overhead image.

FIG. 15 show the overhead image 205 after performing the process shown in FIG. 5, where FIG. 15(*a*) shows an example of a first overhead image, and 15(*b*) shows an example of a second overhead image. As shown in FIG. 15(*a*), the edges of the curb stone 303, the guard rail 305, and the other vehicle 306 are continuous. As compared with the three-dimensional objects in the overhead image 205 shown in FIG. 3, three-dimensional objects in FIG. 15(*a*) can be recognized as the same object. Further, as shown in FIG. 15(*b*), when the parts which lose pixel information are not colored, the edges of the curb stone 303, the guard rail 305, and the other vehicle 306 are continuous. As a result, the three-dimensional objects can be easily recognized.

As explained above, the vehicle circumferential image providing device 1 determines a type of a three-dimensional object at the circumference of the vehicle, and performs a proper image correction process to the overhead image 205, thereby enabling the driver to easily recognize three-dimensional object at the circumference of the vehicle and solving the problem of a loss of feeling of distance.

Figure 16:
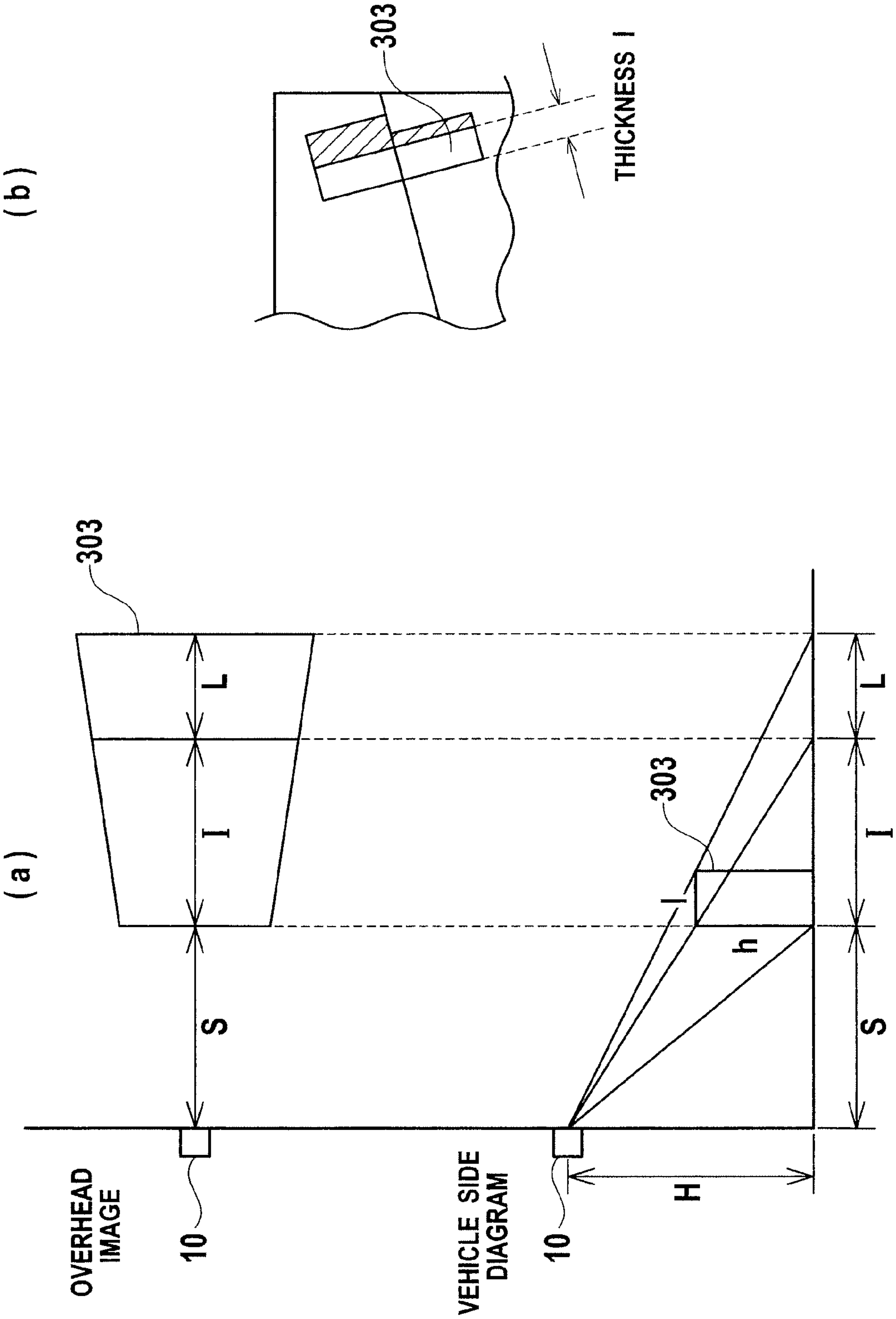
FIG. 16 explain a modification of the vehicle circumferential image providing device according to the first embodiment, where FIG. 16(*a*) shows a principle of obtaining a thickness of a three-dimensional object, and FIG. 16(*b*) shows an example of the overhead image to which a correction process is performed corresponding to a thickness.

FIG. 16 explain a modification of the vehicle circumferential image providing device 1 according to the first embodiment, where FIG. 16(*a*) shows a principle of obtaining a thickness of a three-dimensional object, and FIG. 16(*b*) shows an example of the overhead image 205 to which a correction process is performed corresponding to a thickness. When the vehicle circumferential image providing device 1 according to the modification determines that a three-dimensional object is present on the ground surface, the vehicle circumferential image providing device 1 obtains a thickness of the three-dimensional object, performs an image correction process to the overhead image 205 corresponding to this thickness, and displays a result in the monitor 60. The curb stone 303 is explained as an example among the three-dimensional objects in FIG. 16.

As shown in FIG. 16(*a*), assume that a first edge of the curb stone 303 is present at a position of a distance S from the camera module 10, that a second edge is present at a position of a distance S+I, and that a third edge is present at a position of a distance S+L. A height H of the camera module 10 is a known value. Therefore, a height h of a three-dimensional object is $h=I\times H/(I+S)$, and a thickness of the three-dimensional object is $I=\{H-h)\times(S+I+L)/H\}-S$. The three-dimensional determining function of the image detecting unit 54 detects a thickness of a three-dimensional object from the above calculation.

The image converting unit 53 performs the correction process so that the curb stone 303 has a thickness 1. In this case, because the edge at the near side of the own vehicle is in contact with the ground surface, the image converting unit 53 adjusts a distance between the edge at the near side of the own vehicle and the edge at the far side of the vehicle so that the thickness of the curb stone 303 becomes 1, based on the edge at the near side of the own vehicle, thereby processing each edge to become continuous at the connected part a. In adjusting this distance, the image converting unit 53 performs a shift process, a thinning process, and a compression process, and fills a predetermined color into the part which loses pixel information. In the above modification, a three-dimensional object in the overhead image 205 can be expressed in an accurate thickness. By displaying the three-dimensional object in a more easily recognizable way, the driver can be prevented from losing a feeling of distance.

As explained above, according to the vehicle circumferential image providing device 1 in the first embodiment, the vehicle circumferential image providing device 1 determines whether edges stride over three-dimensional objects from a state of the edges striding over the connected parts a to d in the overhead image 205 obtained by combining the coordinate-converted images 201 to 204, among the detected edges. When the edges striding over the connected parts a to d form a three-dimensional object, the edges are deviated at the connected parts a to d, from a relationship of installation positions of the plural camera modules 10. As explained above, it can be determined whether the edges form a three-dimensional object, from the state of the edges striding over the connected parts a to d.

When the edges striding over the connected parts a to d form a three-dimensional object, it is determined whether the three-dimensional object is present on the ground surface, or present in the air, or present both on the ground surface and in the air, from the state of the edges. When the three-dimensional object is present on the ground surface, the edges of the three-dimensional object at the near side of the own vehicle in each coordinate-converted image are continuous at the connected parts a to d. When the three-dimensional object is present in the air, a deviation occurs in the edges of the three-dimensional object at the near side of the own vehicle in each coordinate-converted image, at the connected parts a to d. When the three-dimensional object is present both on the ground surface and in the air, a deviation occurs in the edges of the three-dimensional object at the near side of the own vehicle in each coordinate-converted image, at the connected parts. At the same time, the edges at the near side are not formed in a straight light or the like, but include one or more inflected points. As explained above, from the state of the edges striding over the connected points, it can be determined whether the three-dimensional object is present on the ground surface, or present in the air, or present both on the ground surface and in the air.

Therefore, a type of a three-dimensional object at the circumference of the vehicle can be determined.

When it is determined that the edges striding over the connected parts a to d form a three-dimensional object, the vehicle circumferential image providing device 1 compares brightness or color information of the three-dimensional object in each of the coordinate-converted images 201 to 204 constituting the connected parts a to d, and determines whether the three-dimensional object in each of the coordinate-converted images 201 to 204 forms the same object. When it is determined that the three-dimensional object in each of the coordinate-converted images 201 to 204 forms the same object, the vehicle circumferential image providing device 1 determines a type of the three-dimensional object. Accordingly, even when the edges of different three-dimensional objects are expressed to stride over the connected parts a to d by chance in the overhead image 205, it is possible to decrease the frequency of determining types of the three-dimensional objects by erroneously determining different objects as the same object.

When it is determined that the edges striding over the connected parts a to d form a three-dimensional object, the vehicle circumferential image providing device 1 determines that the three-dimensional object is present on the ground surface when the edges of the three-dimensional objects at the near side of the own vehicle in each coordinate-converted image are continuous at the connected parts a to d. That the edges of the three-dimensional objects at the near side of the own vehicle in each coordinate-converted image are continuous at the connected parts a to d indicates that the edges at the near side of the own vehicle are present on the ground surface. That is, because the coordinate conversion is performed using the ground surface as a reference surface, no deviation occurs in the three-dimensional object present on the ground surface. Therefore, in the above case, it can be determined that the three-dimensional object is present on the ground surface.

When it is determined that a three-dimensional object is present on the ground surface, the overhead image is processed so that the edges at the far side of the three-dimensional object in each coordinate-converted image are continuous at the connected parts. When the three-dimensional object is present on the ground surface, as shown in FIG. 4(*a*), the three-dimensional object becomes slanted from a relationship of installation positions of the plural camera modules 10, and a recognized amount becomes different. As a result, the upper end of the three-dimensional object, that is, the edges at the far side are expressed in deviation at the connected parts a to d in the overhead image 205. Consequently, the driver can easily lose distance from the vehicle to the three-dimensional object. The loss of distance can be restricted, by processing the edges at the far side to become continuous at the connected parts a to d to cancel this deviation.

When it is determined that the edges striding over the connected parts a to d form a three-dimensional object, the vehicle circumferential image providing device 1 determines that the three-dimensional object is present in the air, when the edges of the three-dimensional object at the near side of the own vehicle in each coordinate-converted image are not continuous at the connected parts a to d and also when the edges at the near side of the own vehicle form a straight line or a curve having no inflected point. That the edges at the near side of the own vehicle in each coordinate-converted image are not continuous at the connected parts a to d indicates that the edges at the near side of the own vehicle include a part not present on the ground surface. That is, because the coordinate conversion is performed using the ground surface as a reference surface, there should not be a deviation in the three-dimensional object present on the ground surface. However, that there is a deviation at the connected parts a to d indicates that the edges include a part present in the air. That the edges at the near side of the own vehicle form a straight line or a curve having no inflected point has a high possibility that two or more objects such as tires and a vehicle body of a vehicle do not constitute the edges but one object constitutes the edges. Therefore, there is a small possibility that the edges form a mixture of a three-dimensional object present on the ground surface and a three-dimensional object present in the air. Consequently, in the above case, it can be determined that the three-dimensional object is present in the air.

When it is determined that a three-dimensional object is present in the air, the vehicle circumferential image providing device 1 compares the edges of the three-dimensional object at the near side of the own vehicle in each coordinate-converted image, and shifts the three-dimensional object in the coordinate-converted image so that the edge at the far position from the own vehicle becomes continuous to the edge at the near position from the own vehicle at the connected parts a to d, among the compared edges. As a result, the edges at the near side of the own vehicle in each coordinate-converted image become continuous. In this case, the edges at the far side of the own vehicle in each coordinate-converted image have a possibility of still being deviated.

After the shifting, the vehicle circumferential image providing device 1 processes the overhead image 205 so that the edges of the three-dimensional image at the far side of the own vehicle in each coordinate-converted image become continuous at the connected parts, while maintaining the connected state of the edges at the near side of the own vehicle. As a result, both the edges at the far side and at the near side of the own vehicle become continuous. Consequently, the driver can easily recognize the three-dimensional object, and can restrict the loss of distance.

When it is determined that the edges at the connected parts a to d form a three-dimensional object, the vehicle circumferential image providing device 1 determines that the three-dimensional object is present in the air, when the edges of the three-dimensional object at the near side of the own vehicle in each coordinate-converted image are not continuous at the connected parts a to d and also when at least one of the edges at the near side of the own vehicle has an inflected point. That the edges at the near side of the own vehicle in each coordinate-converted image are not continuous at the connected parts indicates that the edges at the near side of the own vehicle at least include a part not present on the ground surface. That is, because the coordinate conversion is performed using the ground surface as a reference surface, there should not be a deviation in the three-dimensional object present on the ground surface. However, that there is a deviation at the connected parts a to d indicates that the edges include a part present in the air. That at least one of the edges at the near side of the own vehicle has an inflected point has a high possibility that two or more objects such as tires and a vehicle body of a vehicle constitute the edges. Therefore, there is also a high possibility that the three-dimensional object is a mixture of a three-dimensional object present on the ground surface and a three-dimensional object present in the air. Consequently, in the above case, it can be determined that the three-dimensional object is a mixture of a three-dimensional object present on the ground surface and a three-dimensional object present in the air.

When it is determined that the three-dimensional object is a mixture of a three-dimensional object present on the ground surface and a three-dimensional object present in the air, the vehicle circumferential image providing device 1 obtains coordinates of a point of the three-dimensional object at the nearest side of the own vehicle in each coordinate-converted image, and obtains a tangent point passing each obtained coordinates. With this arrangement, coordinates of a ground point at which the three-dimensional object as a mixture of a three-dimensional object present on the ground surface and a three-dimensional object present in the air is in contact with the ground surface is obtained, and a line connecting between the contact ground point and the three-dimensional object is also obtained.

The vehicle circumferential image providing device 1 compares the edges of the three-dimensional object at the near side of the own vehicle in each coordinate-converted image. The vehicle circumferential image providing device 1 processes the three-dimensional object in the coordinate-converted image so that the edge at the far position from the own vehicle becomes continuous to the edge at the near position from the own vehicle at the connected parts, among the compared edges, and also that the three-dimensional object does not exceed the contact point. As a result, the edges of the three-dimensional object at the near side of the own vehicle in each coordinate-converted image become continuous. Because the three-dimensional object does not exceed the tangent line, a three-dimensional object as a mixture of a three-dimensional object present on the ground surface and a three-dimensional object present in the air is not processed to exceed the line connecting between the contact ground point and the three-dimensional object. The overhead image 205 does not express the three-dimensional object at a nearer side of the own vehicle than the line. In this case, the edges at the far side of the own vehicle in each coordinate-converted image have a possibility of still generating a deviation.

After the processing, the overhead image 205 is processed so that the edges at the far side of the own vehicle in each of the coordinate-converted images 201 to 204 become continuous at the connected parts a to d. As a result, both the edges at the far side and at the near side of the own vehicle become continuous, and the driver can easily recognize the three-dimensional object.

As a result, the overhead image 205 does not express the three-dimensional object at a nearer side of the own vehicle than the line. At the same time, both the edges at the near side and at the far side of the own vehicle become continuous, and the driver can easily recognize the three-dimensional object, and can restrict loss of distance.

At least one of the shift process, the thinning process, and the compression process is performed. In the overhead image 205, a predetermined color is filled in the part which loses pixel information. As a result, the image-processed state can be shown to the driver. Particularly, when a color (such as a red color) usually not present on the ground surface is used as a predetermined color, the image-processed state can be shown more to the driver.

When a three-dimensional object striding over the connected parts a to d reaches the end of the overhead image 205 in any one of the coordinate-converted images 201 to 204, the vehicle circumferential image providing device 1 processes so that the three-dimensional objects in the coordinate-converted images 201 to 204 not reaching the end of the overhead image 205 also reach the end of the overhead image 205. As a result, three-dimensional objects striding over the connected parts a to d can be easily recognized as the same object, without performing the process of setting the edges at the far side of the own vehicle to be continuous.

When it is determined that the edges at the connected parts a to d form a three-dimensional object, this three-dimensional object is highlighted. Therefore, the three-dimensional object in the displayed overhead image can be notified to the driver for the driver to easily recognize this object.

When it is determined that the edges at the connected parts a to d form a three-dimensional object, presence of the three-dimensional object can be auditorily notified to the driver to inform the driver about the presence of the three-dimensional object in voice.

According to the modification of the vehicle circumferential image providing device 1 in the first embodiment, when it is determined that a three-dimensional object is present on the ground surface, a thickness of the three-dimensional object is obtained. A distance between the edge of the three-dimensional object at the near side of the own vehicle and the edge at the far side of the own vehicle is adjusted in each coordinate-converted image, corresponding to the obtained thickness, thereby processing the edges at the far side to become continuous at the connected parts a to d. As explained above, because the distance between the edge of the three-dimensional object at the near side of the own vehicle and the edge at the far side of the own vehicle is adjusted in each of the coordinate-converted images 201 to 204, corresponding to the thickness of the three-dimensional object, the thickness of the three-dimensional object in the overhead image 205 can be properly expressed. The three-dimensional object can be displayed as if this object is actually observed from immediately above. Therefore, the three-dimensional object can be displayed to the driver for the driver to easily recognize the object. Further, because the edges at the far side are set continuous at the connected parts, a deviation between the edges can be cancelled, and loss of distance can be restricted.

A second embodiment of the present invention is explained next. A vehicle circumferential image providing device 2 according to the second embodiment is similar to that of the first embodiment, with a different part of the processing content. Differences from the first embodiment are explained below.

In the vehicle circumferential image providing device 2 according to the second embodiment, the process at step ST3 shown in FIG. 5 shown in the first embodiment is different from the process in the second embodiment. The vehicle circumferential image providing device 2 according to the second embodiment is different from that in the first embodiment in that the device 2 in the second embodiment does not detect edges in the whole of the overhead image 205 but detects edges from a part of the overhead image 205.

Figure 17:
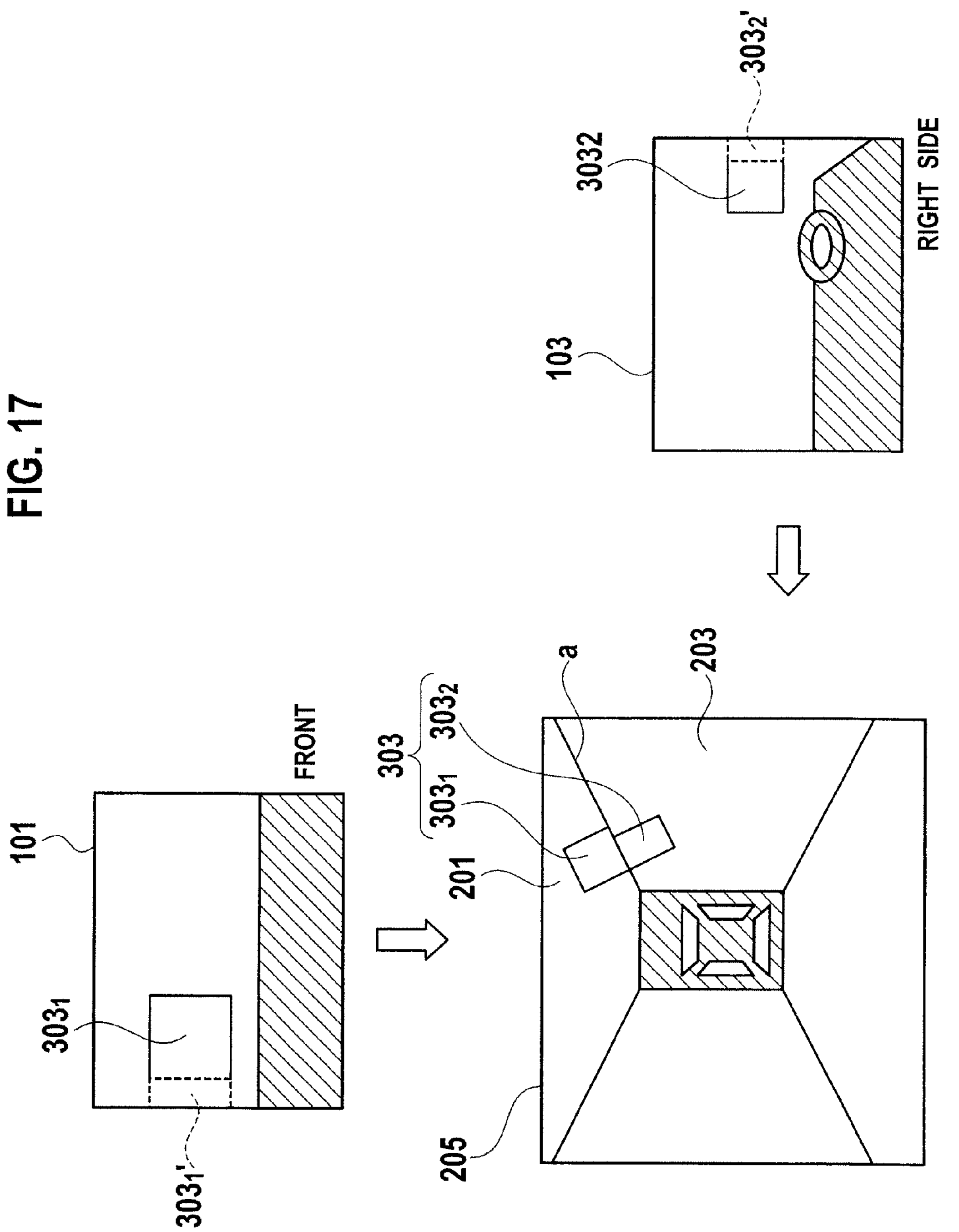
FIG. 17 explains a process of a vehicle circumferential image providing device according to a second embodiment, and explains a process performed in place of the process at step ST3 shown in FIG. 5.

FIG. 17 explains the process of the vehicle circumferential image providing device 2 according to the second embodiment, and explains the process performed in place of the process at step ST3 shown in FIG. 5. Imaging regions of the plural camera modules 10 are redundant with imaging regions of other camera modules 10. The image converting unit 53 discards data in the redundant parts at the time of generating the overhead image 205.

The process is explained in detail. As shown in FIG. 17, the overhead image 205 shows the curb stone 303. Because the curb stone 303 strides over the connected part a, the curb 303 is also shown in a front image 101 and a right side image 103 as images before coordinate-converting the coordinate-converted images 201 and 203 constituting this connected part a.

In performing the coordinate conversion, the image converting unit 53 does not coordinate-convert the whole of the front image 101, but discards a part of the front image 101. Therefore, a curb stone $\mathbf{303}_1$ expressed in the front image 101 is not whole coordinate-converted, but a part (a part of a reference numeral $\mathbf{303}_1'$ shown in FIG. 17) is discarded. Similarly, a curb stone $\mathbf{303}_2$ expressed in the right side image 103 is not whole coordinate-converted, but a part (a part of a reference numeral $\mathbf{303}_2'$ shown in FIG. 17) is discarded.

The discarded part is a part redundant with the front image 101 and the right side image 103. That is, the same part is expressed in the front image 101 and the right side image 103. Therefore, the redundant part is discarded so as not to obtain the overhead image 205 by redundantly coordinate-converting the same part.

The image detecting unit 54 according to the second embodiment compares brightness or color information of three-dimensional objects present in the redundant part, and determines whether the three-dimensional objects are the same object. Accordingly, when the three-dimensional objects are the same object, brightness or color information of the same part is compared, thereby making it possible to determine more accurately whether the three-dimensional objects are the same object.

Figure 18:
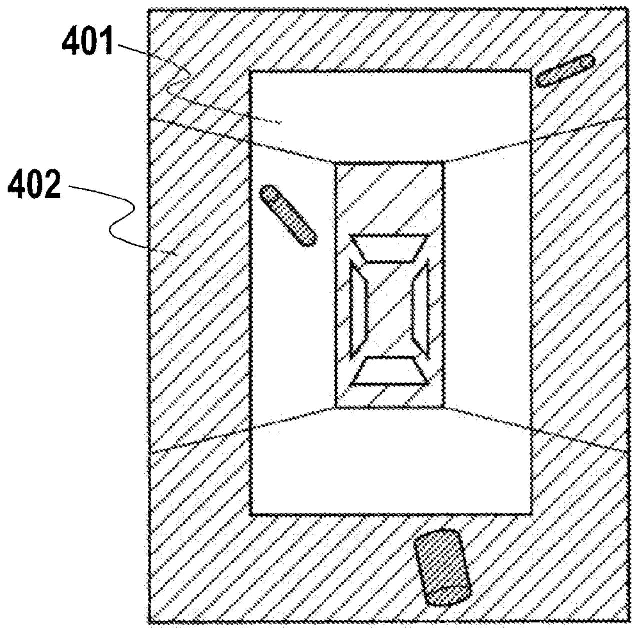
FIG. 18 is a first diagram showing an edge detecting method of the vehicle circumferential image providing device according to the second embodiment.
Figure 19:
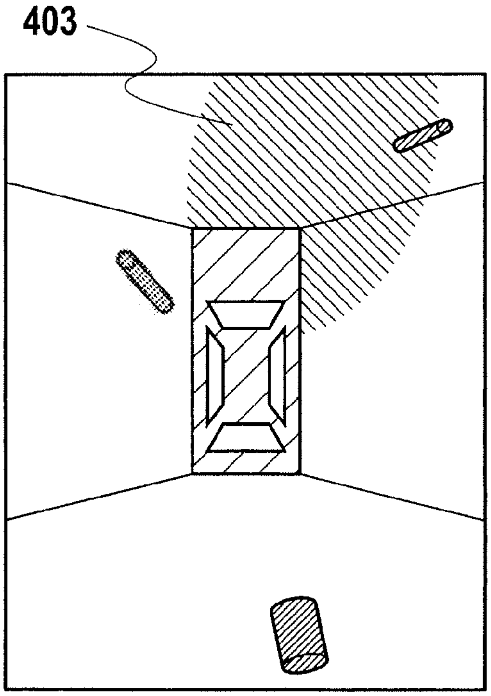
FIG. 19 is a second diagram showing the edge detecting method of the vehicle circumferential image providing device according to the second embodiment.

Next, an edge detecting method according to the second embodiment is explained. FIG. 18 is a first diagram showing the edge detecting method of the vehicle circumferential image providing device 2 according to the second embodiment, and FIG. 19 is a second diagram showing the edge detecting method of the vehicle circumferential image providing device 2 according to the second embodiment.

As shown in FIG. 18, in the second embodiment, a region within a constant distance from the own vehicle is a first region 401, and a region at the outside of the first region 401 is a second region 402. When a vehicle speed of the own vehicle is less than a predetermined speed, the image detecting unit 54 does not detect the second region 402, and detects the first region 401. When the vehicle speed is equal to or higher than the predetermined speed, the image detecting unit 54 does not detect edges in the first region 401, and detects edges in the second region. As explained above, in the second embodiment, the edge detecting function of the image detecting unit 54 detects edges of parts far from the own vehicle when the speed of the own vehicle is equal to or higher than a predetermined speed and also when the speed of the own vehicle is lower than the predetermined speed.

When the speed of the own vehicle is high, the driver needs to visually confirm parts relatively far from the own vehicle. On the other hand, when the speed of the own vehicle is low, the driver needs to visually confirm the vicinity of the own vehicle. Therefore, when the speed of the own vehicle is equal to or higher than the predetermined speed, the image detecting unit 54 detects edges at the parts which the driver needs to visually confirm, by detecting the edges at the parts farther from the own vehicle than edges near from the own vehicle to be detected when the speed of the own vehicle is smaller than the predetermined speed.

A size of a region can be set variable, by not limiting sizes like those of the fixed regions of the first and second regions 401 and 402 set in advance as shown in FIG. 18.

As shown in FIG. 19, in the second embodiment, the proceeding direction of the own vehicle (particularly, the region in which the vehicle passes) is determined as an edge detection region 403, based on the information of the steering angle sensor and the shift signal sensor 40. By detecting edges in this region 403, edges in other regions do not need to be detected. With this arrangement, edges of a three-dimensional object having a possibility of being in contact with the own vehicle can be detected. In the example shown in FIG. 19, the far sides in the edge detection region 403 can be cut, when the vehicle speed is low. When the vehicle speed is high, edges in the far region can be detected.

As explained above, the vehicle circumferential image providing device 2 according to the second embodiment can determine a type of a three-dimensional object at the circumference of the vehicle, in a similar manner to that in the first embodiment. The vehicle circumferential image providing device 2 can also determine that a three-dimensional object is present on the ground surface, and can restrict loss of distance. The device can also determine that a three-dimensional object is present in the air, and can also determine that a three-dimensional object is a mixture of a three-dimensional object present on the ground surface and a three-dimensional object present in the air. The vehicle circumferential image providing device 2 can further show an image-processed state to the driver, and can display a three-dimensional object striding over the connected parts a to d so that the driver can easily recognize the three-dimensional object as the same object. The device can notify to the driver a three-dimensional object displayed in the overhead image so that the driver can more easily understand the three-dimensional object, and can auditorily notify presence of the three-dimensional object to the driver.

Further, according to the second embodiment, when the edges striding over the connected parts a to d form a three-dimensional object, brightness or color information of the three-dimensional objects present in the discarded part at the time of generating the overhead image 205 is compared among the images before coordinate conversion of the coordinate-converted images constituting the connected parts a to d. With this arrangement, it is determined whether the three-dimensional image in each of the coordinate-converted images 201 to 204 is the same object. When each three-dimensional image is determined to be the same object, a type of the three-dimensional object is determined. The imaging regions of the plural camera modules 10 are redundant with the imaging regions of other camera modules 10. The image converting unit 53 discards data of the redundant part at the time of generating the overhead image 205. Each camera module 10 images the same part with other camera modules, at the redundant part. Therefore, by comparing the brightness or color information of three-dimensional objects present at the discarded part at the time of generating the overhead image 205, brightness or color information of the same part is compared. As a result, whether the three-dimensional objects are the same object can be determined more accurately.

When the speed of the own vehicle is equal to or higher than the predetermined speed, the image detecting unit 54 detects in the overhead image edges in the region farther from the own vehicle than edges near from the own vehicle to be detected when the speed of the own vehicle is smaller than the predetermined speed. In this case, when the speed of the own vehicle is high, the driver needs to visually confirm the parts relatively far from the own vehicle. On the other hand, when the speed of the own vehicle is low, the driver needs to visually confirm the vicinity of the own vehicle. Therefore, when the speed of the own vehicle is equal to or higher than the predetermined speed, the image detecting unit 54 detects in the overhead image edges in the region farther from the own vehicle than edges near from the own vehicle to be detected when the speed of the own vehicle is smaller than the predetermined speed. With this arrangement, it is possible to detect edges of a three-dimensional object at a part to be visually recognized by the driver. Further, a region in which edges are detected can be limited, and thus processing load can be decreased.

Because the regions in the proceeding direction of the own vehicle are detected in the overhead image, edges of a three-dimensional object having a possibility of being in contact with the own vehicle can be detected. Further, regions in which edges are detected can be limited, and thus processing load can be decreased.

While the present invention has been explained above based on embodiments, the invention is not limited thereto. Changes can be made to the embodiments without departing from the scope of the present invention, and the respective embodiments can be combined.

INDUSTRIAL APPLICABILITY

The present invention is applicable to a vehicle circumferential image providing device that provides vehicle circumferential images to a driver.

The invention claimed is:

1. A vehicle circumferential image providing device configured to provide an image at a circumference of a vehicle to a driver, the vehicle circumferential image providing device comprising:

a plurality of imaging units configured to image the circumference of the vehicle, wherein the plurality of imaging units are configured to image in mutually different directions;

a first image processing unit configured to coordinate convert images at the circumference of the vehicle imaged by the plurality of imaging units using a ground surface as a reference surface, and generate an overhead image by combining the coordinate-converted images;

an edge detecting unit configured to detect edges in the overhead image generated by the first image processing unit;

a determining unit configured to determine continuity of edge lines extending over connected parts of the coordinate-converted images, among edge lines detected by the edge detecting unit; and a second image processing unit configured to perform imaging processing by setting edge lines at a far side of the vehicle to match edge lines at a near side of the vehicle, thereby setting the edge lines to be continuous at the connected parts, when the edge lines extending over the connected parts of the coordinate-converted images are discontinuous.

2. The vehicle circumferential image providing device according to claim 1, wherein the second image processing unit is configured such that, when a plurality of edge lines extending over the coordinate-converted images are present, and edge lines at the far side of the vehicle are discontinuous among the plurality of edge lines, the second image processing unit sets the edge lines at the far side of the vehicle to be continuous at the connected parts while maintaining the continuity of the edge lines at the near side of the vehicle.

3. The vehicle circumferential image providing device according to claim 2, further comprising a unit configured to determine whether a plurality of edge lines extending over the connected parts of the coordinate-converted images constitute the same object, wherein the second image processing unit is configured such that, when it is determined that the plurality of edge lines extending over the connected parts of the coordinate-converted images constitute the same object, the second image processing unit specifies edge lines present at the near side of the vehicle and edge lines present at the far side of the vehicle.

4. The vehicle circumferential image providing device according to claim 1, wherein the second image processing unit is configured such that, when the edge lines extending over the coordinate-converted images are discontinuous, and the edge lines have inflected points, the second image processing unit sets the edge lines to be continuous at the connected parts so that the edge lines do not exceed a tangent line connecting points at which an object represented by the edge lines contacts the ground surface.

5. The vehicle circumferential image providing device according to claim 1, wherein the second image processing unit is configured such that, when a plurality of edge lines extending over the coordinate-converted images are present, and the edge lines at the near side of the vehicle are continuous among the plurality of edge lines, the second image processing unit sets the edge lines at the far side of the vehicle to be continuous at the connected parts while maintaining the continuity of the edge lines at the near side of the vehicle.

6. The vehicle circumferential image providing device according to claim 1, wherein the second image processing unit is configured to perform at least one of a shift process of shifting an edge, a thinning process of thinning a pixel, and a compression process of compressing an image, to set edges to be continuous at the connected parts.

7. The vehicle circumferential image providing device according to claim 6, wherein the second image processing unit is configured to perform a process of filling a predetermined color into a part losing pixel information in an overhead image, by performing at least one of the shift process, the thinning process, and the compression process.

8. The vehicle circumferential image providing device according to claim 1, wherein the edge detecting unit is configured such that, when a speed of the vehicle is equal to or higher than a predetermined speed, the edge detecting unit performs edge detection in a region farther from the vehicle in the overhead image than from the vehicle when a speed of the vehicle is less than the predetermined speed.

9. The vehicle circumferential image providing device according to claim 1, wherein the edge detecting unit performs edge detection in a region of a proceeding direction of the vehicle in the overhead image.

10. A vehicle circumferential image providing method for providing an image at a circumference of a vehicle to a driver, the vehicle circumferential image providing method comprising:

a step of imaging mutually different directions of the circumference of the vehicle;

a step of coordinate-converting the images at the circumference of the vehicle imaged using a ground surface as a reference surface, and generating an overhead image by combining the coordinate-converted images;

a step of detecting edges in the generated overhead image;

a step of determining continuity of edge lines extending over connected parts of the coordinate-converted images, among detected edge lines; and a step of performing imaging processing by setting edge lines at a far side of the vehicle to match edge lines at a near side of the vehicle, thereby setting the edge lines to be continuous at the connected parts, when the edge lines extending over the connected parts of the coordinate-converted images are discontinuous.

* * * * *